United States Patent
Suzuki et al.

(10) Patent No.: US 8,052,574 B2
(45) Date of Patent: Nov. 8, 2011

(54) TRANSMISSION, STRADDLE-TYPE VEHICLE PROVIDED WITH THE SAME, AND CONTROL METHOD FOR TRANSMISSION

(75) Inventors: Masaya Suzuki, Shizuoka (JP); Kazutaka Hiroi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 992 days.

(21) Appl. No.: 11/959,373

(22) Filed: Dec. 18, 2007

(65) Prior Publication Data
US 2008/0161155 A1 Jul. 3, 2008

(30) Foreign Application Priority Data
Dec. 28, 2006 (JP) ................... 2006-354049

(51) Int. Cl.
*F16H 59/00* (2006.01)
(52) U.S. Cl. ....................................... 477/98
(58) Field of Classification Search ............. 74/335, 74/337.5; 477/98, 97; 701/55, 56, 58, 65
See application file for complete search history.

(56) References Cited

U.S. PATENT DOCUMENTS

| | | | | |
|---|---|---|---|---|
| 5,590,563 | A * | 1/1997 | Kuwahata et al. | 74/337.5 |
| 6,085,607 | A | 7/2000 | Narita et al. | 74/335 |
| 6,519,520 | B2 * | 2/2003 | Shin | 701/55 |
| 7,291,092 | B2 * | 11/2007 | Tohta et al. | 477/98 |
| 7,398,753 | B2 * | 7/2008 | Masuda et al. | 123/192.2 |
| 7,533,752 | B2 * | 5/2009 | Mochizuki et al. | 180/219 |
| 7,828,695 | B2 * | 11/2010 | Inoue et al. | 477/34 |
| 7,882,756 | B2 * | 2/2011 | Mochizuki et al. | 74/335 |
| 2002/0007241 | A1 * | 1/2002 | Kupper et al. | 701/51 |
| 2008/0076632 | A1 * | 3/2008 | Watanabe et al. | 477/98 |

FOREIGN PATENT DOCUMENTS
JP 11-082709 3/1999
* cited by examiner

*Primary Examiner* — David D Le
*Assistant Examiner* — David J Hlavka
(74) *Attorney, Agent, or Firm* — Keating & Bennett, LLP

(57) ABSTRACT

An electronically controlled transmission in which a single drive motor is used to drive a shift shaft, in which shift shock is reduced during continuous running. The transmission has a shift shaft, an actuator, a gear box and a control portion. The actuator causes the shift shaft to rotate. The gear box includes a gear shift mechanism, a clutch mechanism, and a crank case that houses the gear shift mechanism and the clutch mechanism. The gear shift mechanism is activated in association with rotation of the shift shaft. The clutch mechanism connects and disconnects transmission of power to the gear shift mechanism from the engine in association with rotation of the shift shaft. The control portion controls the actuator based on the temperature of the gear box.

10 Claims, 17 Drawing Sheets

Fig. 17

| CORRECTION FUNCTION | SPEED OF ENGINE 29 |
|---|---|
| $\Delta T(t)\ 1$ | $r \leqq R1$ |
| $\Delta T(t)\ 2$ | $R1 < r \leqq R2$ |
| $\Delta T(t)\ 3$ | $R2 < r \leqq R3$ |
| $\Delta T(t)\ 4$ | $R3 < r$ |

TRANSMISSION, STRADDLE-TYPE VEHICLE PROVIDED WITH THE SAME, AND CONTROL METHOD FOR TRANSMISSION

RELATED APPLICATIONS

This application claims the benefit of priority under 35 USC 119 of Japanese patent application no. 2006-354049, filed on Dec. 28, 2006, which application is hereby incorporated by reference in its entirety.

BACKGROUND OF THE INVENTION

1. Field of the Invention

The present invention relates to a transmission for a straddle type vehicle and, in particular, relates to an electronically controlled transmission that uses an actuator to engage and disengage a clutch and to perform a shift operation of a gear box, and a control method for the transmission.

2. Description of Related Art

Manual transmissions typically have a clutch lever for engaging and disengaging a clutch, and a shift pedal for performing gear change. When a shift change is performed, the rider must operate both a clutch pedal and the shift pedal. As a result, there is demand for a transmission that allows a shift change to be performed more simply, and that is easier for the rider to use.

In light of this demand, a manual transmission has been proposed that allows both engagement and disengagement of a clutch and a gear change to be performed by foot operation of a shift pedal that is connected to a shift shaft (transmission shaft). Thus, the rider can perform a shift change by just operating the shift pedal. Further, the transmission has a relatively simple structure and low cost.

In order to improve ease of use for the rider still further, an electronically controlled transmission has also been proposed in which the shift shaft is driven by a drive motor. For example, JP-A-11-082709 and U.S. Pat. No. 6,085,607 propose an electronically controlled transmission in which a shift shaft is driven by a single drive motor. In this electronically controlled transmission, a shift change is performed just by a simple switch operation. Operations that require great proficiency, like partial clutch engagement, are not necessary. With this electronically controlled transmission, the shift shaft is driven by the single drive motor. As a result, the electronically controlled transmission is simple and has a low cost.

However, the inventors of the present invention have found that if a vehicle mounted with the electronically controlled transmission described in JP-A-11-082709 and U.S. Pat. No. 6,085,607 is run continuously, there is variation in the magnitude of the shift shock that occurs during shifting. More specifically, as the vehicle is continuously run, the shift shock becomes relatively large as compared to immediately after start up.

With a manual transmission having a foot-operated shift pedal, a rider who is highly proficient in the shift operation can sense variation in the magnitude of the shift shock during continuous running, and can rapidly adjust the shift pedal operation in accordance with this variation. As a result, the magnitude of the shift shock does not vary that significantly.

It is possible to reduce variation in the magnitude of the shift shock during continuous running even with an electronically controlled transmission. More particularly, the shift operation can be minutely adjusted in accordance with a plurality of sensors provided in the transmission. However, as described above, the key features of an electronically controlled transmission that has a shift shaft driven by a single drive motor are ease of use and simplicity. If a plurality of sensors is disposed in the transmission, the structure becomes complicated and simplicity is lost.

SUMMARY OF THE INVENTION

The invention has been devised in light of these circumstances and reduces shift shock that occurs during continuous running in an electronically controlled transmission, in which a shift shaft is driven by a single drive motor, without use of a complicated structure.

A transmission according to the invention includes a shift shaft; an actuator; a gear box; and a control portion. The actuator causes the shift shaft to rotate. The gear box includes a gear shift mechanism, a clutch mechanism, and a case that houses the gear shift mechanism and the clutch mechanism. The gear shift mechanism is actuated in association with rotation of the shift shaft. The clutch mechanism connects and disconnects transmission of power from the engine to the gear shift mechanism in association with rotation of the shift shaft. The control portion controls the actuator based on a temperature of the gear box. A straddle type vehicle according to the invention is provided with the above-described transmission.

The invention also provides a control method for controlling a transmission including a shift shaft; an actuator; and a gear box. The actuator causes the shift shaft to rotate. The gear box includes a gear shift mechanism, a clutch mechanism, and a case that houses the gear shift mechanism and the clutch mechanism. The gear shift mechanism is actuated in association with rotation of the shift shaft. The clutch mechanism connects and disconnects transmission of power from the engine to the gear shift mechanism in association with rotation of the shift shaft. The control method according to the invention controls the actuator based on a temperature of the gear box.

The invention reduces shift shock that occurs during continuous running without use of a complicated structure.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 17 is a graph that shows the relationship of correction functions and engine speed according to the invention.

DETAILED DESCRIPTION OF THE INVENTION

The events that led to the realization of the invention are first explained. The inventors, based on perceptive research, found that, regardless of whether the operation of the motor driving the shift shaft is constant, when the vehicle is continuously run, there is variation in the magnitude of shift shock. In addition, the inventors found that the variation in magnitude of shift shock is caused by temporal variations in a clutch engagement state while the vehicle is continuously run.

Moreover, the inventors have found that the variation of the clutch engagement state is caused by temperature changes of the gear box in the electronically controlled transmission. More particularly, the change in the clutch engagement state is caused by an increase in the temperature of the gear box during continuous running. A change in the temperature of the gear box causes a particularly large change in the clutch engagement state in electronically controlled transmissions that have a comparatively large number of components. Therefore, the inventors devised the invention based on the hypothesis of controlling rotation of the shift shaft based on the temperature of the gear box.

An embodiment of the invention is explained with reference to a moped type motorcycle 10 shown in FIG. 1. However, a straddle type vehicle according to the invention is not limited to a moped type motorcycle and may be, for example, a motor cycle type motorcycle, a scooter type motorcycle, an off road motorcycle or the like. In addition, the straddle type vehicle may not be a motorcycle and may be, for example, an ATV (All Terrain Vehicle) or a snow mobile.

—Overview of the Structure of Motorcycle 10—

Figure 1:
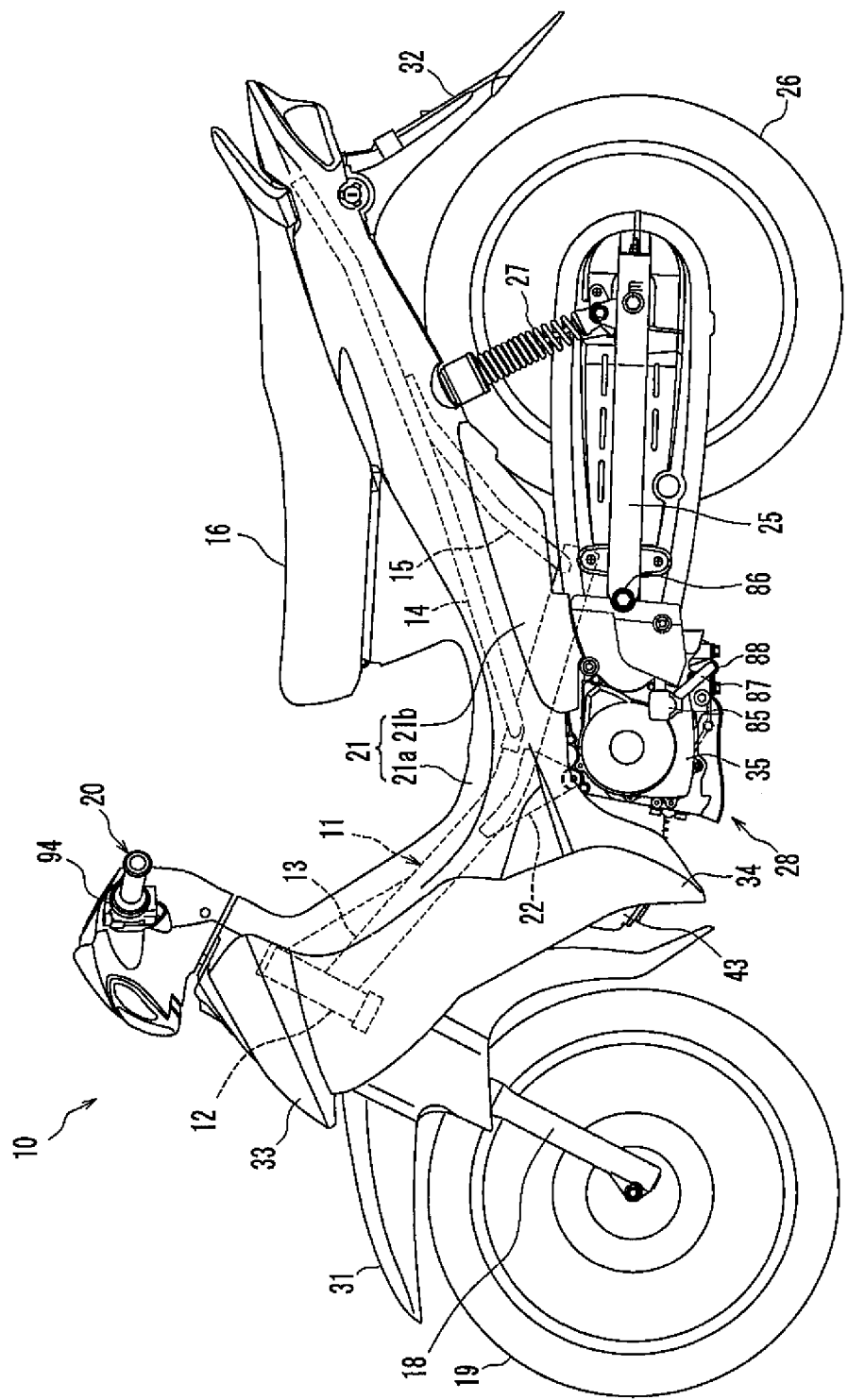
FIG. 1 is a left side view of a motorcycle that embodies the invention.

FIG. 1 is a side view of motorcycle 10. In the following description, the directions front and rear, and left and right are from the perspective of a rider seated on a seat 16.

Motorcycle 10 has a body frame 11 including a steering head pipe 12, a main frame 13, a pair of seat rails 14, and a pair of back stays 15. Steering head pipe 12 extends diagonally downwards toward the front from a steering handle 20. A lower end of steering head pipe 12 is connected to a front wheel 19 via a front fork 18. A front fender 31 covers above and to the rear of front wheel 19.

Main frame 13 extends diagonally downwards to the rear from an intermediate section of steering head pipe 12. Seat rails 14 extend slightly diagonally upwards to the rear from an intermediate section of main frame 13. Back stays 15 extend diagonally upward to the rear from an end section of main frame 13. A tip of each back stay 15 is connected to an intermediate section of seat rails 14. Seat rails 14 are supported at a rear section thereof by back stays 15. A vehicle body cover 21 including a main cover 21a and a side cover 21b mainly covers the top, left and right sides of body frame 11. Motorcycle 10 is also provided with a front cowl 33 and left and right leg shields 34.

A left and right pair of first engine brackets 22 that protrudes downwards is attached to the intermediate section of main frame 13. A left and right pair of second engine brackets and a rear arm bracket are respectively attached to a rear end section of main frame 13. In the following explanation, brackets and the like that are provided on main frame 13 are treated as being part of body frame 11.

The above-described rear arm bracket protrudes downwards from a rear end section of main frame 13. A pivot shaft 86 provided on the rear arm bracket swingably supports a front end section of a rear arm 25. A rear wheel 26 is supported by a rear end section of rear arm 25. A rear half of rear arm 25 and body frame 11 are connected by a cushion unit 27. A rear fender 32 covers the area diagonally rearward and upward from rear wheel 26.

An engine unit 28 that drives rear wheel 26 is supported by body frame 11. Engine unit 28 includes a cylinder 43 that extends forward, or forward and diagonally upward, from a crank case 35.

Foot rests 85 are disposed to left and right sides of engine unit 28. Foot rests 85 are attached to crank case 35 via an attachment plate 88 that is fixed to a connecting pole 87.

Figure 2:
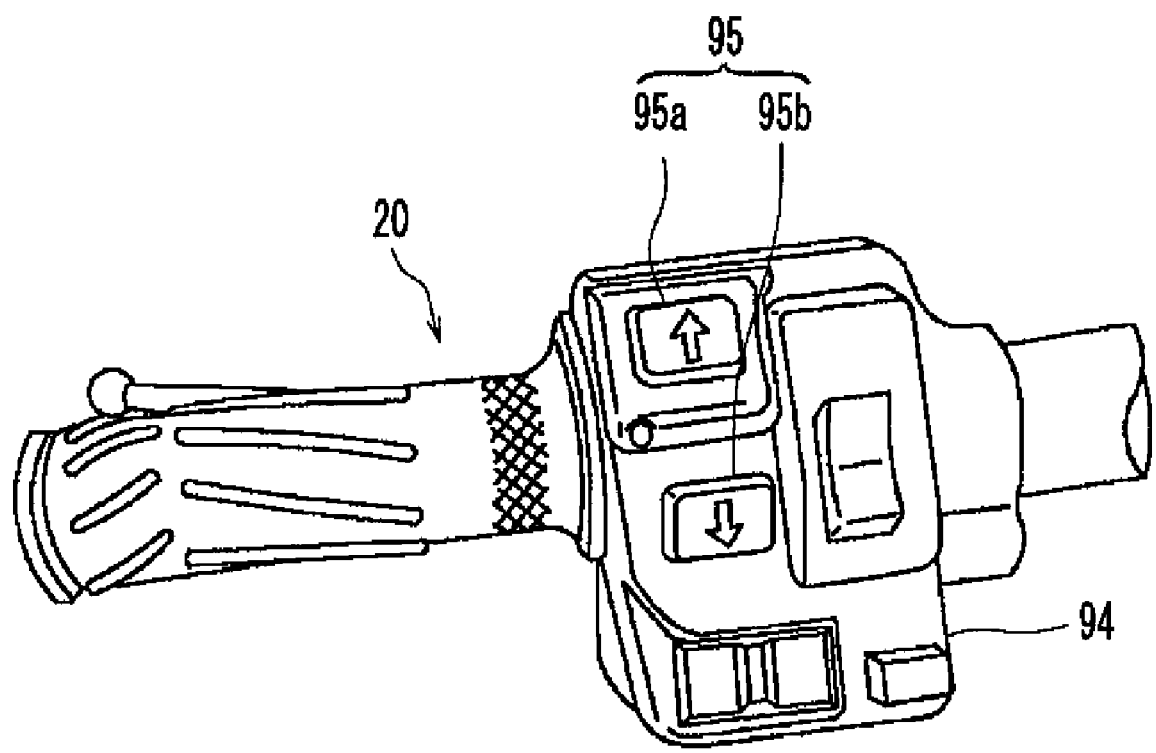
FIG. 2 is an enlarged perspective view of a steering handle section of the motorcycle.

FIG. 2 is an enlarged perspective view of a section of steering handle 20. As can be seen from FIG. 2, a switch box 94 having a shift switch 95 is provided inside a left hand side grip of steering handle 20. Shift switch 95 is configured by, for example, a shift up switch 95a and a shift down switch 95b. Shift up switch 95a is manually operated to shift up a gear box 38 and shift down switch 95b is manually operated to shift down gear box 38.

—Overview of the Structure of Engine Unit 28—

Figure 3:
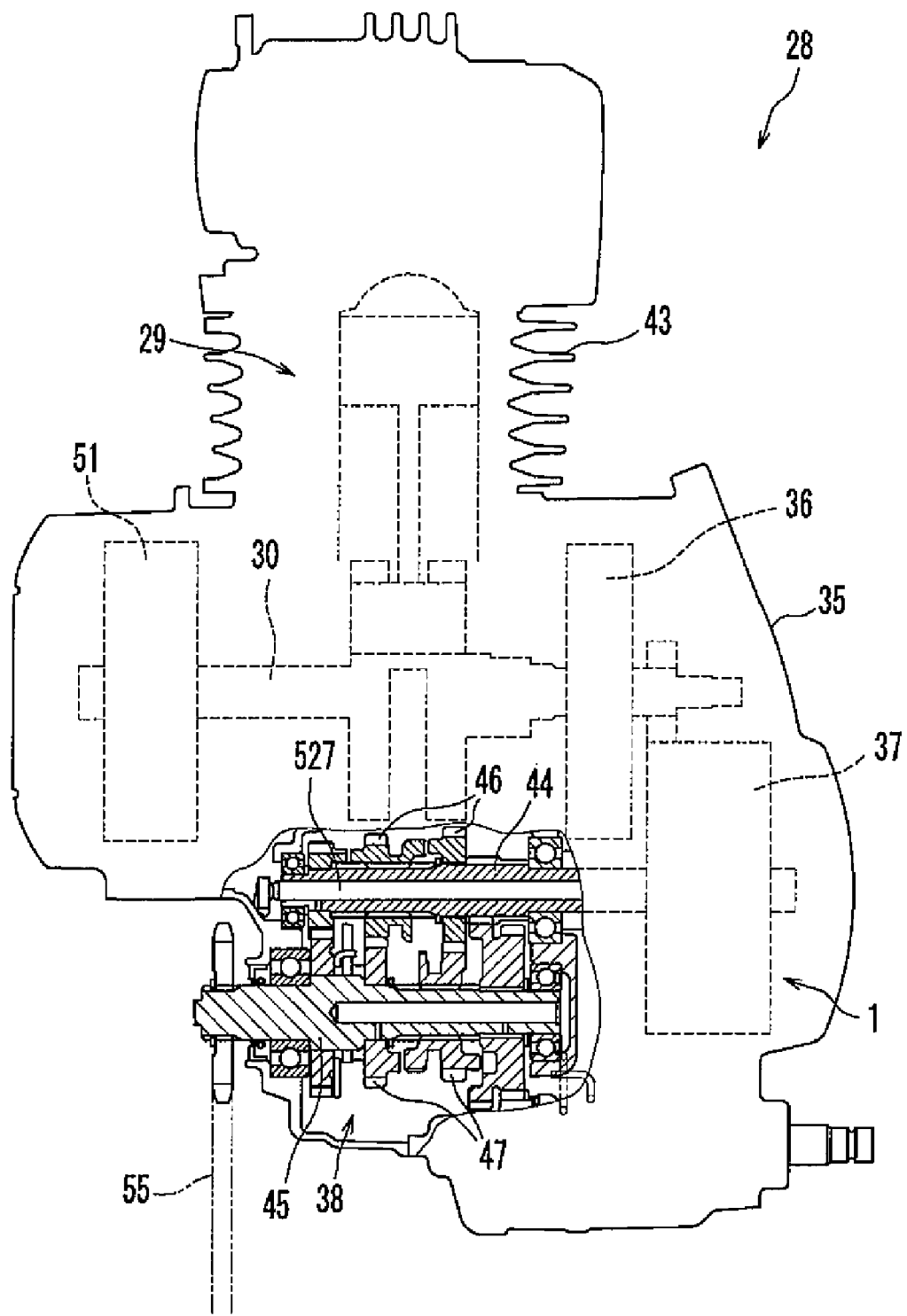
FIG. 3 is a cross sectional view of an engine unit of the motorcycle, with a focus on one section thereof.

Next, the structure of engine unit 28 is explained with reference to FIGS. 3 and 4. As can be seen in FIG. 3, engine unit 28 includes an engine 29, a centrifugal clutch 36, a transmission 1 and a generator 51. Engine 29, centrifugal clutch 36, transmission 1 and generator 51 are housed in crank case 35. Transmission 1 is connected to and transmits driving force of engine 29. More specifically, transmission 1 is connected to a crank shaft 30 of engine 29 via centrifugal clutch 36. Alternatively, transmission 1 may be directly connected to engine 29.

In this embodiment, engine 29 is a single cylinder 4-stroke engine. However, engine 29 may be a 2-stroke engine or may be an engine with multiple cylinders. Further, another type of drive source such as an electric motor may be used instead of or in combination with engine 29.

—Detailed Structure of Engine Unit 28—

The structure of each element of engine unit 28 is now explained in detail.

(Centrifugal Clutch 36)

Centrifugal clutch 36 controls transmission of the driving force of engine 29 to rear wheel 26 when the engine speed is low, for example, during idling or immediately after starting to drive.

Figure 4:
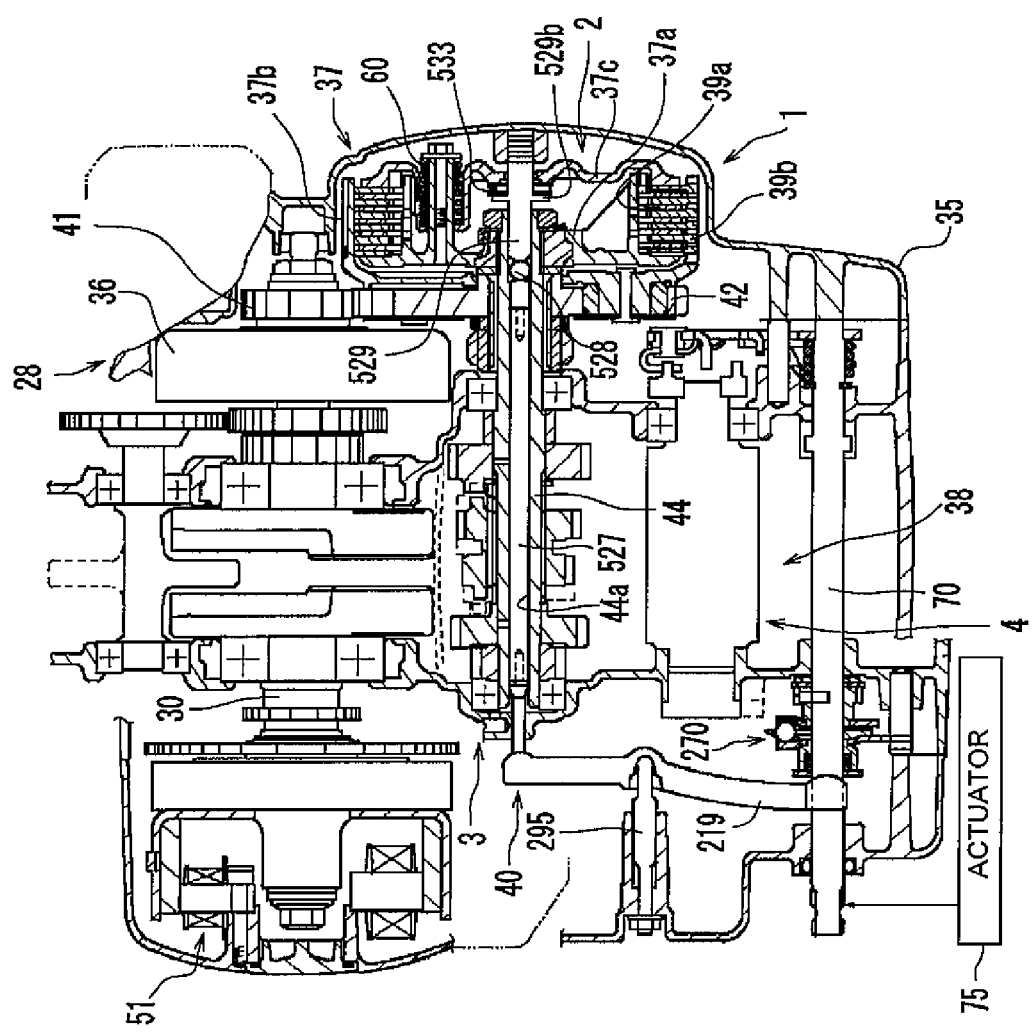
FIG. 4 is a cross sectional view of the engine unit.

As can be seen from FIG. 4, centrifugal clutch 36 is attached to a right end section of crank shaft 30. Centrifugal clutch 36 is provided with a clutch housing surrounding a clutch boss. The clutch boss is fixed to and rotates with crank shaft 30, and the clutch housing is rotatable with respect to crank shaft 30.

When rotation speed of the clutch boss of centrifugal clutch 36 is low, the clutch housing rotates relative to the clutch boss. On the other hand, when rotational speed of the clutch boss is high, the clutch housing is not able to rotate relative to the clutch boss, that is, the clutch housing rotates along with the clutch boss. As a result, when the rotation number per unit time (engine speed) of engine 29 is low, such as during idling or the like, centrifugal clutch 36 is disengaged. When engine speed increases during running, centrifugal clutch 36 is engaged.

(Structure of Transmission 1)

Figure 7:
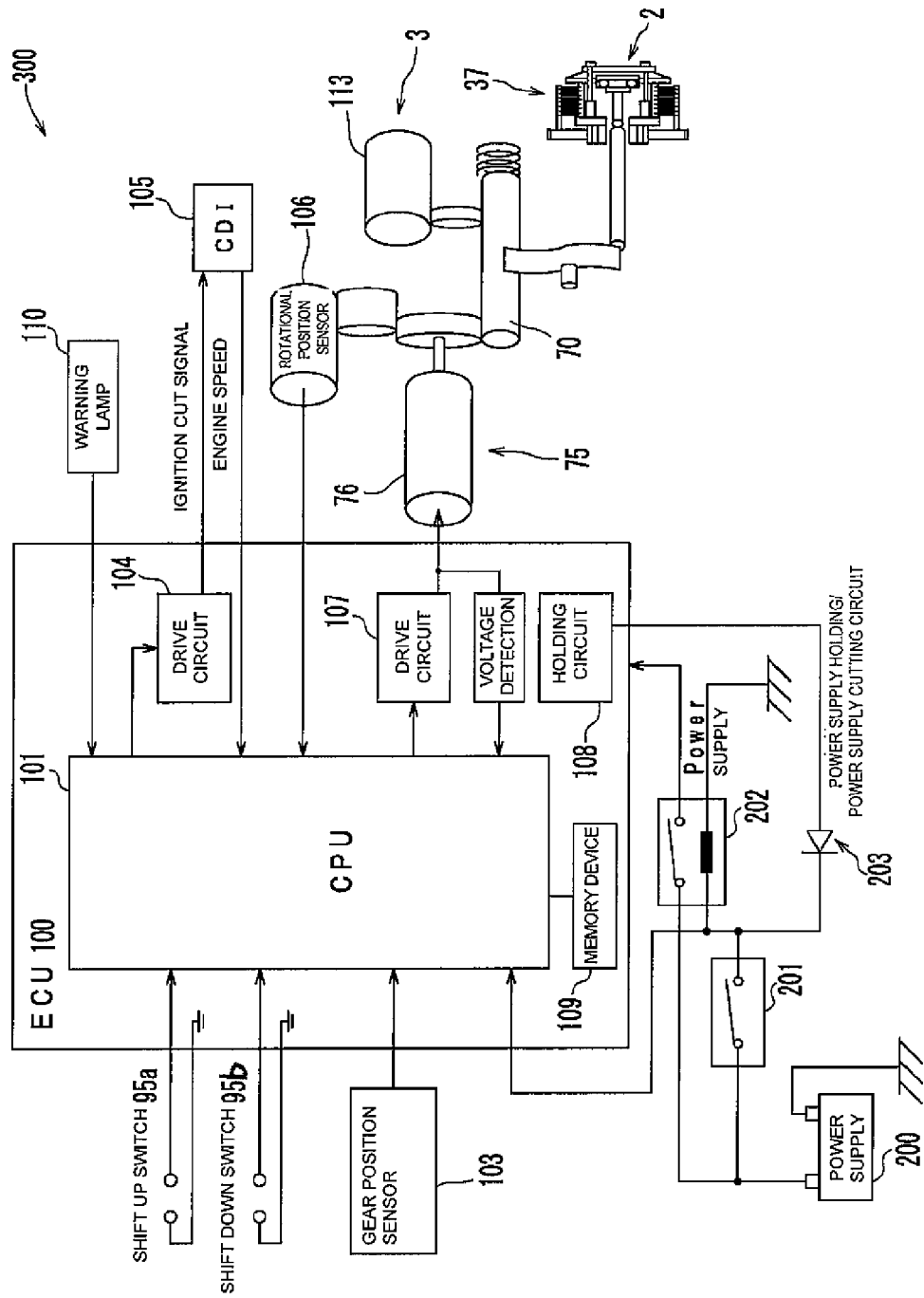
FIG. 7 is a block diagram of a control portion mounted in the motorcycle.

Transmission 1, as can be seen in FIG. 4, has an actuator 75, gear box 38, a shift shaft 70 and an ECU 100 (FIG. 7). Actuator 75 includes a motor that rotates shift shaft 70, a rotational position sensor 106 (FIG. 7) and a speed reduction mechanism connected to the motor. Rotational position sensor 106 detects the rotational position of shift shaft 70.

(Gear Box 38)

Gear box 38 includes a clutch mechanism 2 and a gear shift mechanism 3. Clutch mechanism 2 includes a variable speed clutch 37 and a clutch transmission mechanism 40. Variable speed clutch 37 is connected to engine 29 via centrifugal clutch 36. In addition, variable speed clutch 37 is connected to gear shift mechanism 3 via a main shaft 44. Variable speed clutch 37 disengages driving force that is transmitted from engine 29 to gear shift mechanism 3. Clutch transmission mechanism 40 actuates variable speed clutch 37 in association with rotation of shift shaft 70.

{Structure of Variable Speed Clutch 37}

In this embodiment, variable speed clutch 37 is a multi plate wet clutch that is lubricated using lubricating oil. However, variable speed clutch 37 may be a dry clutch that does not use lubricating oil. The lubricating oil of variable speed clutch 37 may be commonly used by engine 29, or variable speed clutch 37 and engine 29 may use separate oils.

Variable speed clutch 37, as can be seen from FIG. 4, includes a clutch boss 37a surrounded by a clutch housing 37b. Clutch boss 37a is attached to main shaft 44 that is parallel with crank shaft 30 such that clutch boss 37a cannot rotate. On the other hand, clutch housing 37b can rotate with respect to main shaft 44. A gear 42 formed in clutch housing 37b meshes with a gear 41 formed in centrifugal clutch 36. As a result, when the clutch housing of centrifugal clutch 36 rotates, clutch housing 37b also rotates.

Clutch boss 37a is provided with a plurality of friction plates 39a that have a ring shape and that are arranged at generally equal distances apart from each other. The intervals between neighboring friction plates 39a can be varied. Clutch housing 37b is provided with a plurality of clutch plates 39b that have a ring shape and that are arranged at generally equal distances apart from each other. The intervals between neighboring clutch plates 39b can be varied. Friction plates 39a are positioned between clutch plates 39b, that is, friction plates 39a and clutch plates 39b are staggered.

A pressure plate 37c is disposed to the right side of clutch boss 37a and can move in the axial direction of main shaft 44. Pressure plate 37c is urged by a compression spring 60 to the left. As a result, the urging force of compression spring 60 causes the intervals between neighboring friction plates 39a and neighboring clutch plates 39b to be reduced, whereby friction plates 39a and clutch plates 39b are pressed together. As a result, friction generated between friction plates 39a and clutch plates 39b causes centrifugal clutch 36 to rotate, thereby causing clutch boss 37a and main shaft 44 to rotate along with clutch housing 37b.

As explained later, when variable speed clutch 37 is disengaged, friction plates 39a and clutch plates 39b are separated from each other. Thus, clutch housing 37b rotates along with rotation of centrifugal clutch 36, but clutch boss 37a and main shaft 44 do not rotate.

{Structure of Clutch Transmission Mechanism 40}

Variable speed clutch 37 is connected to and actuated by clutch transmission mechanism 40. Clutch transmission mechanism 40 includes a torque converting mechanism 270, a pressure lever 219, a support shaft 295, a first push rod 527, a ball 528 and a second push rod 529. Torque converting mechanism 270 is attached to shift shaft 70 and converts rotary motion of shift shaft 70 to axial direction reciprocating motion of shift shaft 70. One end of pressure lever 219 is connected to torque converting mechanism 270. A central section in the longitudinal direction of pressure lever 219 is supported by support shaft 295 so as to be capable of swinging. The other end of pressure lever 219 is connected to one end of first push rod 527. First push rod 527 is slidably inserted in a through hole 44a that passes through main shaft 44 in the axial direction of main shaft 44. In addition, ball 528 and second push rod 529 are inserted in through hole 44a. Ball 528 is disposed between first push rod 527 and second push rod 529. Second push rod 529 has a flange 529b. Flange 529b abuts against pressure plate 37c via a bearing 533.

Figure 5:
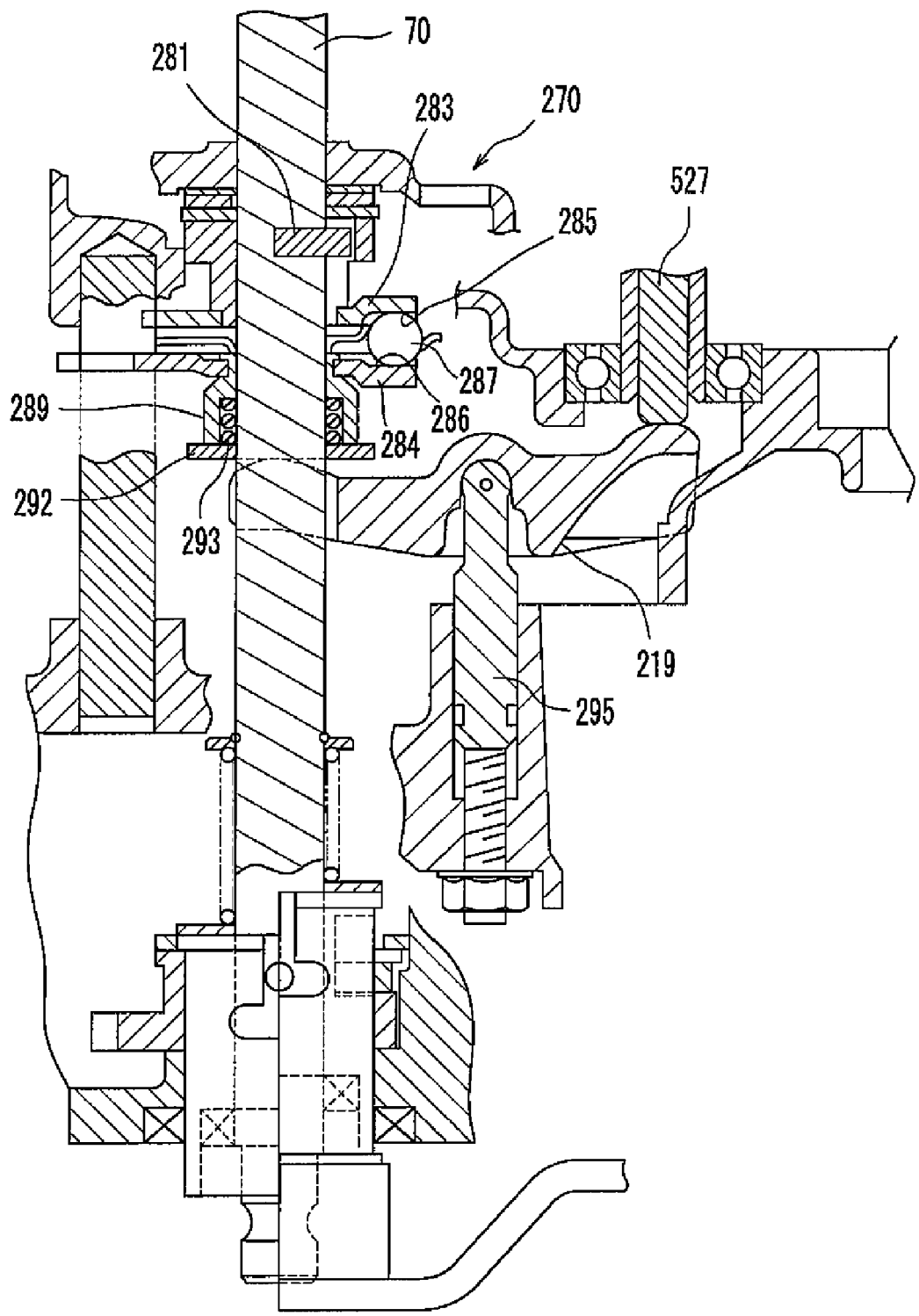
FIG. 5 is an enlarged cross sectional view of a torque conversion mechanism of the motorcycle.

FIG. 5 is an enlarged cross sectional view of torque converting mechanism 270. Torque converting mechanism 270 is provided with a first and second cam plates 283 and 284 that are disk shaped. Second cam plate 284 faces first cam plate 283. First cam plate 283 is fixed by a connecting pin 281 to shift shaft 70 such that first cam plate 283 is not capable of rotating and cannot be displaced. As a result, first cam plate 283 rotates along with shift shaft 70. On the other hand, second cam plate 284 is fixed to a boss 289. Boss 289 can rotate with respect to shift shaft 70 and can slide in the axial direction of shift shaft 70. A lower end section of boss 289 abuts against a left end tip of pressure lever 219 via a pressure plate 292. A helical compression spring 293 is disposed between boss 289 and pressure plate 292.

Three first cam grooves 285 that extend in a circumferential direction are formed in the surface of first cam plate 283 that faces second cam plate 284. Three second cam grooves 286 are formed in the surface of second cam plate 284 that faces first cam plate 283. Each groove 286 is shorter than the corresponding groove 285. More particularly, each first cam groove 285 extends further to the outer side in the circumferential direction than the corresponding second cam groove 286. Balls 287 are disposed between first cam grooves 285 and second cam grooves 286. Note that, FIG. 5 only shows one pair of cam grooves 285 and 286, and one ball 287.

{Structure of Gear Shift Mechanism 3}

As can be seen from FIG. 3, gear box 38 includes a drive shaft 45 that is disposed substantially parallel to main shaft 44. Drive shaft 45 is connected to rear wheel 26 via a power transmission means 55 (FIG. 1). Power transmission means 55 may be, for example, a chain, a belt, a drive shaft or the like.

A plurality of speed change gears 46 are provided in an outer periphery surface of main shaft 44. A plurality of speed change gears 47 are provided in an outer periphery surface of drive shaft 45. Speed change gears 47 and speed change gears 46 are inter-meshed with each other. More specifically, a selected one of speed change gears 46 rotates along with main shaft 44. Further, a selected one of speed change gears 47 rotates along with drive shaft 45. At least one of speed change gears 46 and speed change gears 47 that have not been selected rotate idly with respect to main shaft 44 or drive shaft 45. Accordingly, driving force of main shaft 44 is transmitted to drive shaft 45 via one of the pairs of selected speed change gears 46 and speed change gears 47. Gear shift mechanism 3 is formed by speed change gears 46, speed change gears 47 and a gear selection mechanism 4.

Figure 6:
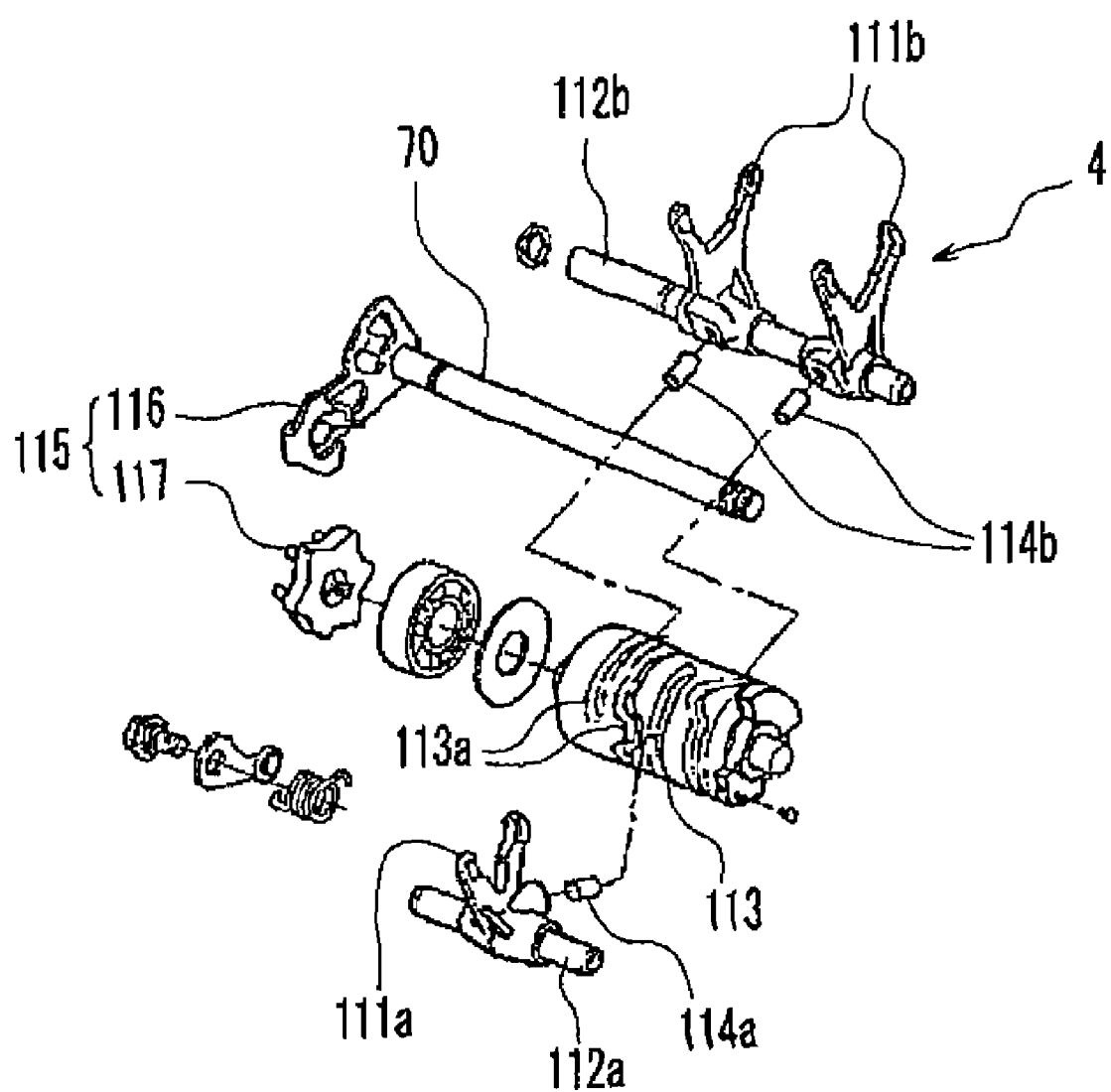
FIG. 6 is an exploded perspective view of a gear selection mechanism of the motorcycle.

FIG. 6 is an exploded perspective view of gear selection mechanism 4. Gear selection mechanism 4 is a mechanism for selecting the speed change gears 46 that rotate along with main shaft 44 and the speed change gears 47 that rotate along with drive shaft 45. Gear selection mechanism 4 includes shift forks 111a, 111b, slide rods 112a, 112b, a shift cam 113 and a ratchet mechanism 115. Shift forks 111a, 111b are not capable of rotating with respect to shift cam 113. Shift fork 111a can slide speed change gears 46 in the axial direction of main shaft 44. Slide rod 112a supports shift fork 111a such that shift fork 111a can move in the axial direction of shift cam 113. An engagement pin 114a attached to slide rod 112a engages with a cam groove 113a formed in the outer periphery of shift cam 113. Shift fork 111b slides speed change gears 47 in the axial direction of drive shaft 45. Slide rod 112b supports shift fork 111b such that shift fork 111b can move in the axial direction of shift cam 113. An engagement pin 114b attached to slide rod 112b is engaged with cam groove 113a formed in the outer periphery of shift cam 113.

Shift cam 113 is connected to shift shaft 70 via ratchet mechanism 115. Ratchet mechanism 115 rotates shift cam 113 each time shift shaft 70 rotates by a determined angle. As a result, shift forks 111a, 111b move in a regular manner. More particularly, ratchet mechanism 115 has a forward-reverse direction ratchet function that shifts one speed at a time. More particularly, ratchet mechanism 115 is provided with a shift arm 116, and a stopper plate 117. Shift arm 116 transmits rotation of shift shaft 70 to shift cam 113. At the same time, shift arm 116 regulates the stroke of shift shaft 70, and inhibits overrun of shift cam 113. Stopper plate 117 fixes shift cam 113 at a determined position.

—Control Portion 300—

FIG. 7 is a block diagram of a control portion 300 that controls engine unit 28. Control portion 300 includes an ECU (electronic control unit) 100 having a CPU 101. Shift up switch 95a, shift down switch 95b, a gear position sensor 103, drive circuits 104, 107, a CDI (Capacitive Discharge Ignition) unit 105, a rotational position sensor 106, a holding circuit 108, a memory device (memory) 109 and a warning lamp 110 are connected to CPU 101. Warning lamp 110 is positioned on steering handle 20 or the like so as to be viewable by a rider seated on seat 16.

CDI unit 105 cuts ignition of engine 29 based on an ignition cut signal supplied via drive circuit 104 by CPU 101, thereby reducing power of engine 29. In addition, CDI unit 105 detects the speed of engine 29 (engine rotational speed), and supplies the detection result to CPU 101.

Gear position sensor 103 detects the gear position. The term "gear position" indicates the rotational position of shift cam 113. CPU 101 obtains the present gear position based on the rotational position of shift cam 113 (FIG. 6) detected by gear position sensor 103.

Actuator 75 is connected to drive circuit 107. Drive circuit 107 controls drive performs PWM (Pulse Width Modulation) control) of a motor 76 based on a control signal from CPU 101. Motor 76 generates driving force that rotates shift shaft 70 based on a control signal from drive circuit 107. As a result, shift shaft 70 rotates, and a clutch operation of variable speed clutch 37 and a gear change are performed. The rotational position of shift shaft 70 is detected by rotational position sensor 106 that is connected to CPU 101. Rotational position sensor 106 may directly or indirectly detect the rotational position of shift shaft 70.

Motorcycle 10 includes a power supply 200, a main switch 201, a main relay 202, a power supply holding/power supply cutting circuit 203. Power supply 200 is connected to ECU 100 via main switch 201 and main relay 202 and supplies a power supply voltage to ECU 100. In addition, power supply 200 supplies a holding voltage to holding circuit 108 via power supply holding/power supply cutting circuit 203.

Main switch 201 is used to start motorcycle 10. When main switch 201 is turned ON, a voltage is supplied to main relay 202 and power supply holding/power supply cutting circuit 203 from power supply 200. Main relay 202 is provided with an exciting coil and contacts. When power supply voltage is supplied to an exciting coil from main switch 201, the contacts are placed in an on state, whereby power supply voltage is also supplied to ECU 100. As a result, motorcycle 10 starts.

Power supply holding/power supply cutting circuit 203 is configured by a voltage regulating diode or the like. When the power supply voltage supplied via main switch 201 is equal to or more than a determined voltage, power supply holding/power supply cutting circuit 203 supplies the holding voltage to holding circuit 108. On the other hand, when the power supply voltage is less than the determined voltage, power supply holding/power supply cutting circuit 203 stops supplying voltage to holding circuit 108.

—Explanation of an Outline of a Shift Operation (Shift Change)—

A shift operation (shift change) is now explained. When shift up switch 95a or shift down switch 95b is manually operated, variable speed clutch 37 is disengaged, a gear change is performed, and variable speed clutch 37 is engaged electrically.

More particularly, when shift switch 95 is operated, a control signal is input to drive circuit 107 from CPU 101. Drive circuit 107 drives actuator 75 based on the control signal. When actuator 75 is driven, shift shaft 70 rotates. As a result of shift shaft 70 rotating, a disengagement operation of variable speed clutch 37, a gear change, and an engagement operation of variable speed clutch 37 are performed in series as described below.

(Disengagement Operation of Variable Speed Clutch 37)

First, the disengagement operation of variable speed clutch 37 is performed along with rotation of shift shaft 70. More specifically, when shift up switch 95a or shift down switch 95b is operated, the control signal is output to drive circuit 107 from CPU 101. Drive circuit 107 controls drive of motor 76 based on the control signal. As a result, shift shaft 70 rotates. Clutch transmission mechanism 40 is then actuated in association with rotation of shift shaft 70. Variable speed clutch 37 is disengaged due to the actuation of clutch transmission mechanism 40.

More particularly, torque converting mechanism 270 of FIG. 5 is actuated in association with rotation of shift shaft 70. More specifically, first cam plate 283 rotates in association with rotation of shift shaft 70, and second cam plate 284 does not rotate in association with shift shaft 70. Thus, first cam plate 283 rotates relative to second cam plate 284. At this time, balls 287 move in the circumferential direction along cam grooves 286 of second cam plate 284 while engaged with cam grooves 285 of first cam plate 283. As shift shaft 70 rotates still further, balls 287 pass out of cam grooves 286 and move to the outside of cam grooves 286. As a result, second cam plate 284 and boss 289 move in a direction away from first cam plate 283. The movement of boss 289 causes the left end section of pressure lever 219 and the pressure plate to be pressed toward the left (FIG. 4).

As can be seen from FIG. 4, pressure lever 219 is swingably supported by support shaft 295. Thus, when the left end section of pressure lever 219 is pressed to the left, first push rod 527 is moved to the right by the right end section of pressure lever 219. As a result, first push rod 527 moves toward the right, whereby ball 528 and second push rod 529 are also pushed by first push rod 527 and thus moved to the right.

As a result of second push rod 529 moving to the right, pressure plate 37*c* moves to the right in resistance to the urging force of compression spring 60. Therefore, the pressurized abutting state of friction plates 39*a* and clutch plates 39*b* is released, and variable speed clutch 37 is disengaged. In other words, rotation of crank shaft 30 is not transmitted to main shaft 44.

(Gear Change)

As described above, when shift shaft 70 reaches the determined angle (a clutch disengagement start angle), variable speed clutch 37 is disengaged. Once the clutch disengagement start angle is exceeded, and shift shaft 70 rotates still further to reach a shift start angle, gear selection mechanism 4 is activated to start gear change.

Until the rotational position of shift shaft 70 reaches the shift start angle, even if shift shaft 70 rotates, shift cam 113 (FIG. 6) does not rotate. However, when the rotational position of shift shaft 70 exceeds the shift start angle, shift cam 113 starts to rotate along with rotation of shift shaft 70. Shift cam 113, as described above, is connected to shift shaft 70 via ratchet mechanism 115. Each time shift shaft 70 rotates a determined angle, shift cam 113 rotates. When shift cam 113 rotates, slide rods 112*a*, 112*b* and shift forks 111*a*, 111*b* move in the axial direction of shift cam 113 in accordance with the shape of cam groove 113*a*. As a result, each of speed change gears 46, 47 is appropriately moved in the axial direction. Thus, the speed change gears 46, 47 used to transmit driving force from main shaft 44 to drive shaft 45 are selected, and the gear change is performed.

(Engagement Operation of Variable Speed Clutch 37)

After the gear change is completed, shift shaft 70 rotates backwards to a reference angle position. Backward rotation of shift shaft 70 causes clutch transmission mechanism 40 to be activated again, and variable speed clutch 37 to be engaged. More particularly, backward rotation of shift shaft 70 causes second push rod 529 to move toward the left. Thus, the urging force of compression spring 60 causes pressure plate 37*c* to move to the left. As a result, friction plates 39*a* and clutch plates 39*b* are once again placed in a pressurized abutting state, and variable speed clutch 37 is engaged.

The shift operation (shift change) is achieved by the above-described disengagement operation of variable speed clutch 37, gear change and engagement operation of variable speed clutch 37.

—Detailed Explanation of Shift Operation (Partial Clutch Engagement Control)—

Figure 8:
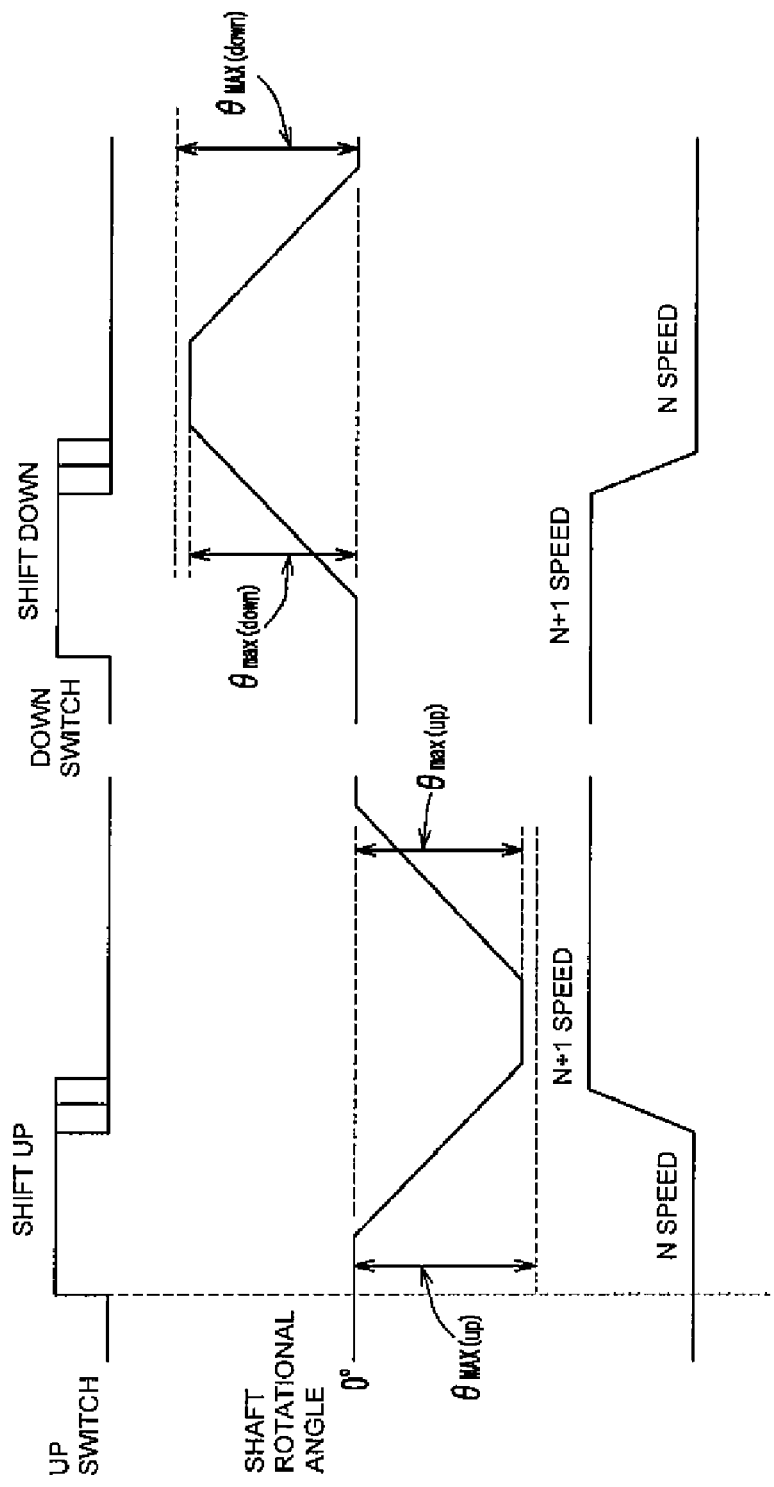
FIG. 8 is a diagram of a shift change operation according to the invention.

The shift change is now explained in more detailed while focusing on the rotational position of shift shaft 70. As can be seen from FIG. 8, when shift up switch 95*a* is operated, shift shaft 70 performs a reciprocating rotary motion in which shift shaft 70 rotates (reverse rotates) as far as a rotational position $\theta_{max\ (up)}$, and then returns back to the reference angle position (0°). On the other hand, in when shift down switch 95*b* is operated, shift shaft 70 performs a reciprocating rotary motion in which shift shaft 70 rotates (forward rotates) as far as a rotational position $\theta_{max\ (down)}$, and then returns back to the reference angle position (0°). While this reciprocating rotary motion of shift shaft 70 is performed, disengagement of variable speed clutch 37, gear change, and engagement of variable speed clutch 37 are performed. A target rotational position $\theta_{max(up)}$ is set to be smaller than a limit rotational position $\theta_{MAX(up)}$ of shift shaft 70, and is set to be a rotational position that allows gear box 38 to fully engage when an up-shift is being performed. $\theta_{max\ (down)}$ is set to be smaller the a limit rotational position $\theta_{MAX\ (down)}$ of shift shaft 70, and is set to be a rotational position that allows gear box 38 to fully engage when a down-shift is being performed.

Figure 9:
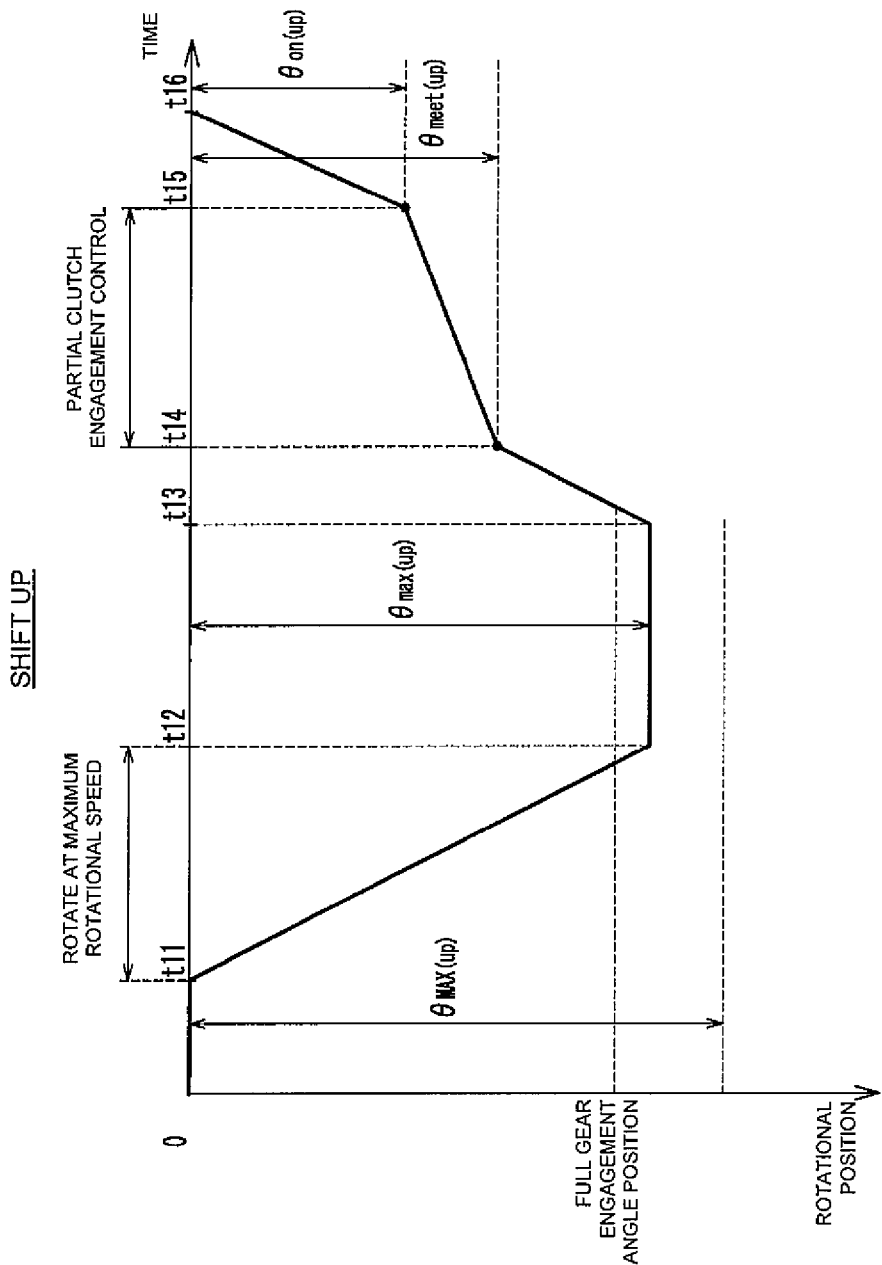
FIG. 9 is a diagram of a shift up operation according to the invention.

More particularly, when shift up switch 95*a* is operated (FIG. 7), as can be seen from FIG. 9, shift shaft 70 rotates toward a target rotational position $\theta_{max\ (up)}$ at a maximum rotation speed by actuator 75 (t11 to t12). After shift shaft 70 reaches target rotational position $\theta_{max\ (up)}$, the rotational position of shift shaft 70 is held at target rotational position $\theta_{max\ (up)}$ from t12 to t13. During the period t11 to t13, variable speed clutch 37 is disengaged, and thereafter the gear change is performed. Between t11 and t12, shift shaft 70 does not necessarily have to rotate at the maximum rotation speed. For example, shift shaft 70 may rotate at a rotation speed that is slower than the maximum rotation speed. However, from the point of view of rapidly completing the shift change, it is favorable that shift shaft 70 rotates at the maximum rotation speed.

Next, shift shaft 70 rotates backward toward a target rotation position $\theta_{meet\ (up)}$ at the maximum rotation speed (t13 to t14). Between t13 and t14, it is not essential for shift shaft 70 to rotate at the maximum rotation speed. However, from the point of view of completing shift change rapidly, it is favorable that shift shaft 70 rotates at the maximum rotation speed. As a result, the interval between friction plates 39*a* and clutch plates 39*b* is gradually reduced.

After the rotational position of shift shaft 70 reaches target rotation position $\theta_{meet\ (up)}$, next, partial clutch engagement control is performed until a target rotation position $\theta_{on\ (up)}$ is reached (t14 to t15). Here, target rotation position $\theta_{meet\ (up)}$ is the rotational position of shift shaft 70 at which variable speed clutch 37 moves from a disengaged state to a partial clutch engagement state. More particularly, target rotation position $\theta_{meet\ (up)}$ is the rotational position of shift shaft 70 at which clutch boss 37*a* starts to rotate along with clutch housing 37*b*. More specifically, actuator 75 is controlled such that the rotational speed of shift shaft 70 becomes slower than the maximum rotation speed between t14 and t15.

More particularly, actuator 75 is controlled to cause shift shaft 70 to rotate at a rotation speed at which shift shock is not generated by variable speed clutch 37 suddenly engaging, and at which a state does not occur where variable speed clutch 37 does not ever engage. Target rotation position $\theta_{on\ (up)}$ is the rotational position of shift shaft 70 at which variable speed clutch 37 is completely engaged. More particularly, target rotation position $\theta_{on\ (up)}$ is the rotational position of shift shaft 70 at which clutch housing 37*b* and clutch boss 37*a* start to rotate at the same rotational speed.

After the rotational position of shift shaft 70 reaches target rotation position $\theta_{on\ (up)}$, shift shaft 70 rotates as far as the reference position (0°) at the maximum rotation speed (t15 to t16). Between t15 and t16, shift shaft 70 does not necessarily have to rotate at the maximum rotation speed. However, from the point of view of rapidly completing the shift change, it is favorable that shift shaft 70 rotates at the maximum rotation speed.

Figure 10:
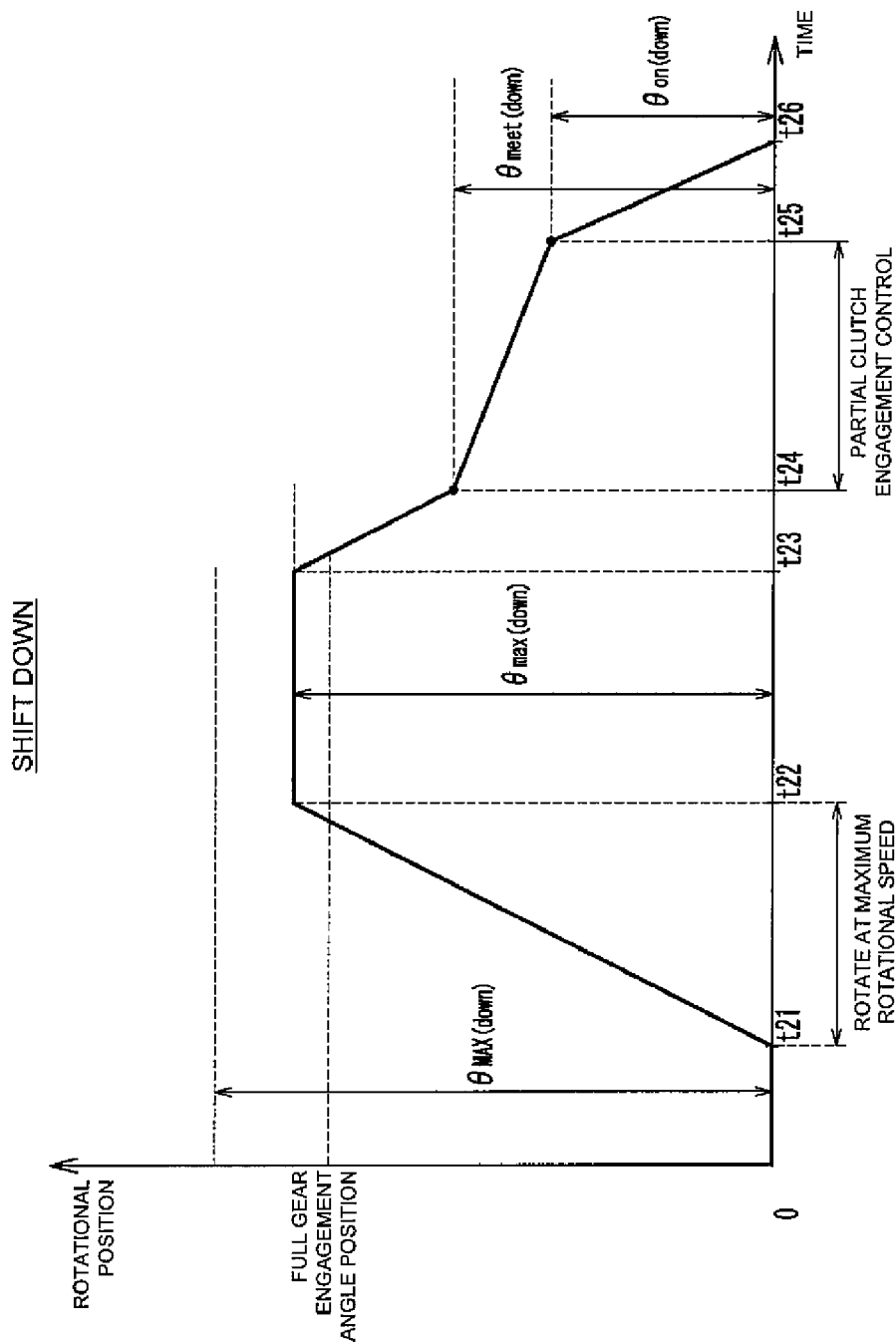
FIG. 10 is a diagram of a shift down operation according to the invention.

In the case of shifting down, as shown in FIG. 10, the rotational direction of shift shaft 70 is opposite to that in the case of shifting up. First, when shift down switch 95*b* is operated, shift shaft 70 rotates toward a target rotational position $\theta_{max\ (down)}$ at the maximum rotation speed t21 to t22). After shift shaft 70 reaches target rotational position $\theta_{max\ (down)}$, the rotational position of shift shaft 70 is held at target rotational position $\theta_{max\ (down)}$ between t22 to t23. During the period t21 to t23, variable speed clutch 37 is disengaged, and thereafter the gear change is performed. Next, shift shaft 70 rotates in the opposite direction toward a target rotation position $θ_{meet\ (down)}$ at the maximum rotation speed (t23 to t24). After the rotational position of shift shaft 70 reaches target rotation position $θ_{meet\ (down)}$, partial clutch engagement control is performed until a target rotation position $θ_{on\ (down)}$ is reached (t24 to t25). After the rotational position of shift shaft 70 reaches target rotation position $θ_{on\ (down)}$, shift shaft 70 rotates as far as the reference position (0°) at the maximum rotation speed (t25 to t26). In the case of shifting down, between t21 and t22, between t23 and t24, and t25 and t26, shift shaft 70 does not necessarily have to rotate at the maximum rotation speed. However, from the point of view of rapidly completing the shift change, it is favorable that shift shaft 70 rotates at the maximum rotation speed during each period.

As described above, partial clutch engagement control is performed to reduce shift shock and to perform shift change in a short time period.

—Measuring the Area of Play of Shift Shaft 70 (Initial Check)—

(Measurement Principle)

The measurement of an area of play of shift shaft 70 that is performed when starting motorcycle 10 is now explained. In overall terms, the measurement of the area of play of shift shaft 70 that is performed when starting motorcycle 10 involves measuring the area of play of shift shaft 70 when engine 29 is started in order to confirm the partial clutch engagement region. The phrase "partial clutch engagement region" indicates the rotational position range of shift shaft 70 in which variable speed clutch 37 is in a partially engaged state. In the following explanation, the "measurement of the area of play of shift shaft 70 that is performed when motorcycle 10 is started" will be referred to as the initial check.

Figure 11:
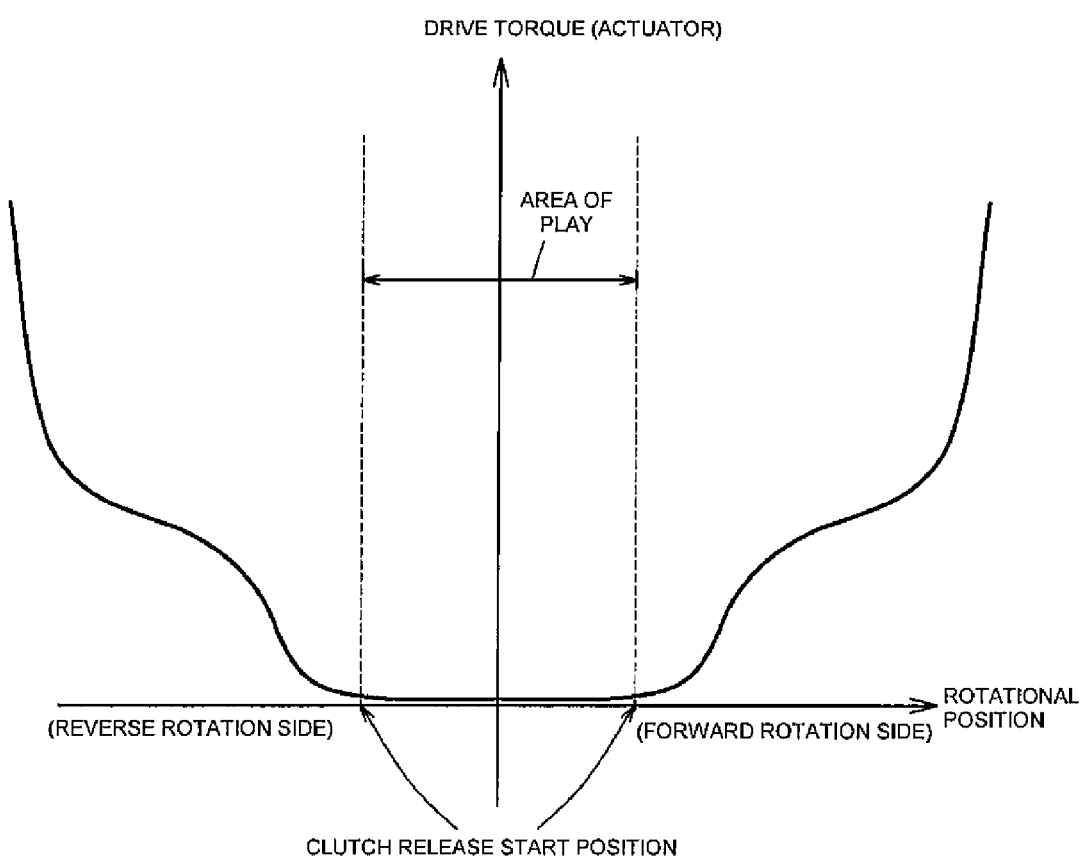
FIG. 11 is a graph that shows a relationship according to the invention of a rotational position of a shift shaft and drive torque of an actuator that drives the shift shaft.

In this embodiment, the area of play of shift shaft 70 is detected using the change characteristics of drive torque that is necessary to rotate shift shaft 70. More particularly, as can be seen from FIG. 11, when the rotational position of shift shaft 70 is inside the area of play, shift shaft 70 rotates idly. As a result, the drive torque of shift shaft 70 is a constant low value. However, when the rotational position of shift shaft 70 reaches a position at which torque converting mechanism 270 starts to be actuated (a clutch release starting position), the drive torque suddenly becomes larger. This phenomenon is used to measure the rotational range of shift shaft 70 that is within the range where the drive torque of shift shaft 70 is constantly low, whereby the area of play of shift shaft 70 is detected.

More particularly, first, a low current that is not sufficient to actuate torque converting mechanism 270 is applied to actuator 75. Thus, shift shaft 70 starts to rotate within the area of play. However, once the clutch release starting position is reached, shift shaft 70 stops. The rotational position at which shift shaft 70 stops is detected by rotational position sensor 106, and the detection result is used as a basis for detecting the area of play.

(Procedure for Measuring the Area of Play)

Figure 12:
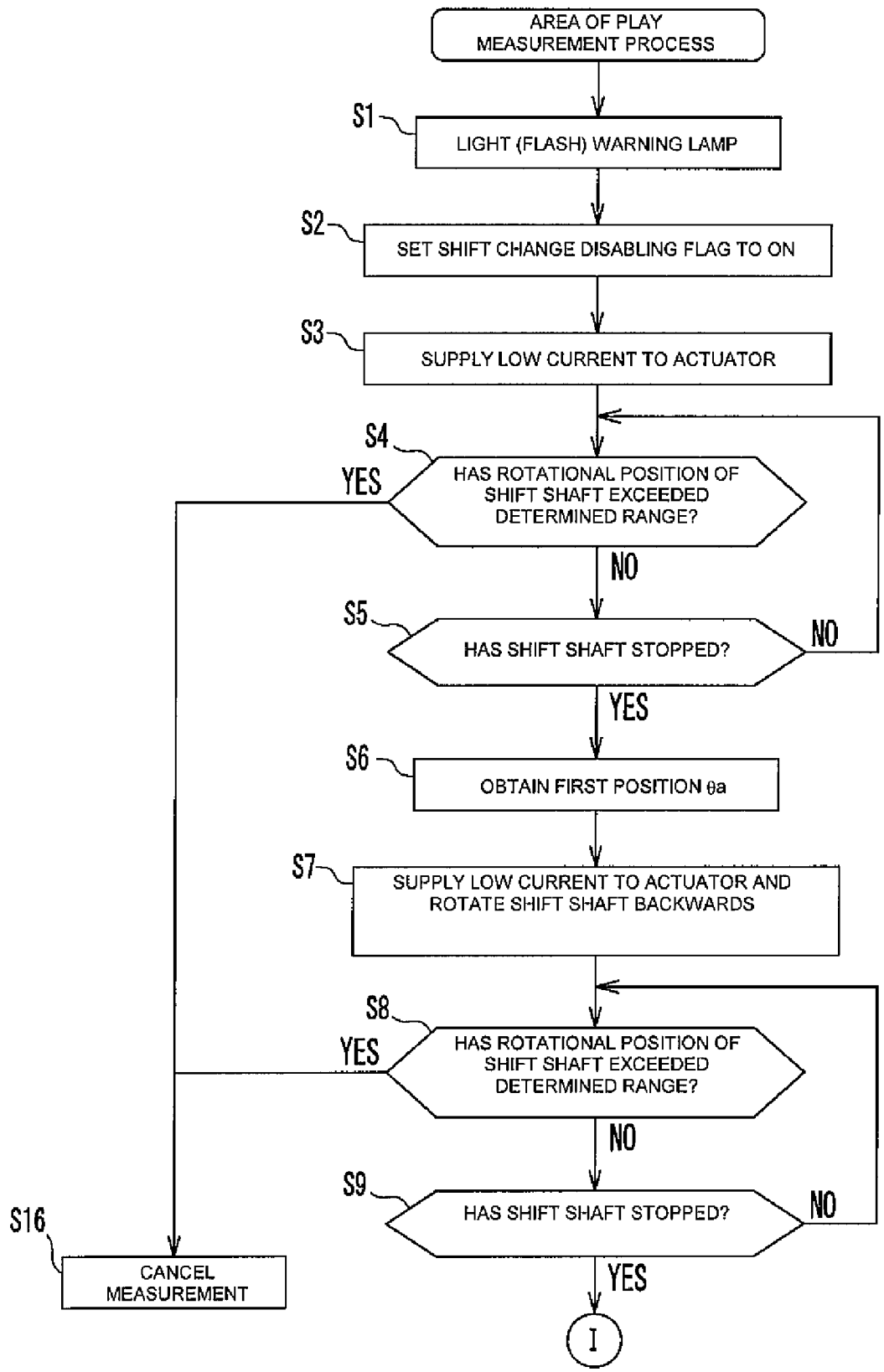
FIG. 12 is a flow chart of a part of a play measurement process according to the invention.
Figure 13:
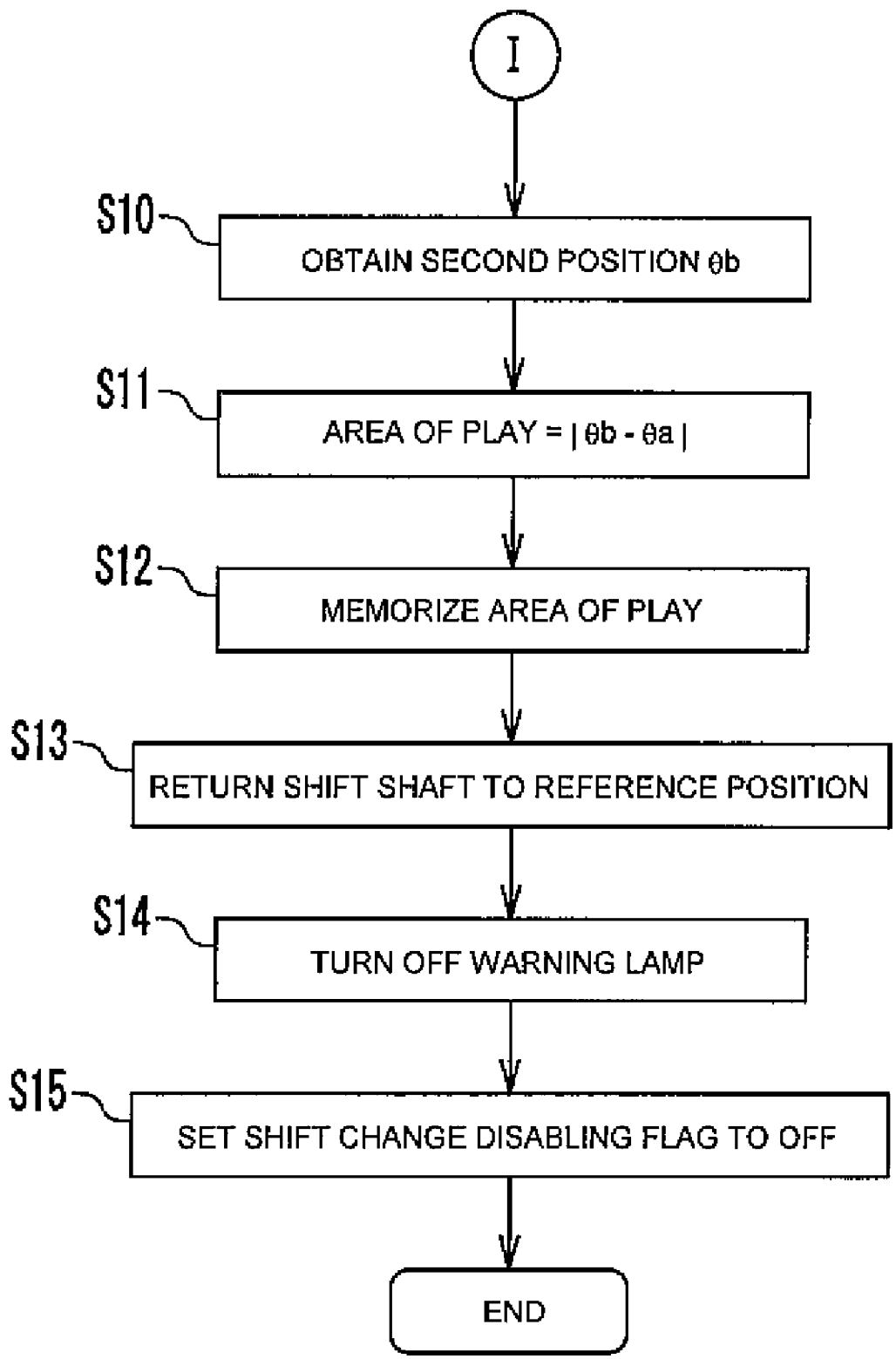
FIG. 13 is a flow chart of area part of the play measurement process.

FIGS. 12 and 13 show the flow of an area of play measurement process that is performed by ECU 100. The area of play measurement process is started in response to main switch 201 being turned ON. In other words, the area of play measurement process is performed when engine 29 is started.

When the area of play measurement process is started, first, warning lamp 110 shown in FIG. 7 is lit or made to flash (step S1). As a result, the rider is notified that the area of play measurement process is being performed.

Next, a shift change disabling flag is set to ON (step S2). While the shift change disabling flag is set to ON, even if shift switches 95 are operated, actuator 75 is not driven. In other words, step S2 regulates the shift change operation.

Figure 14:
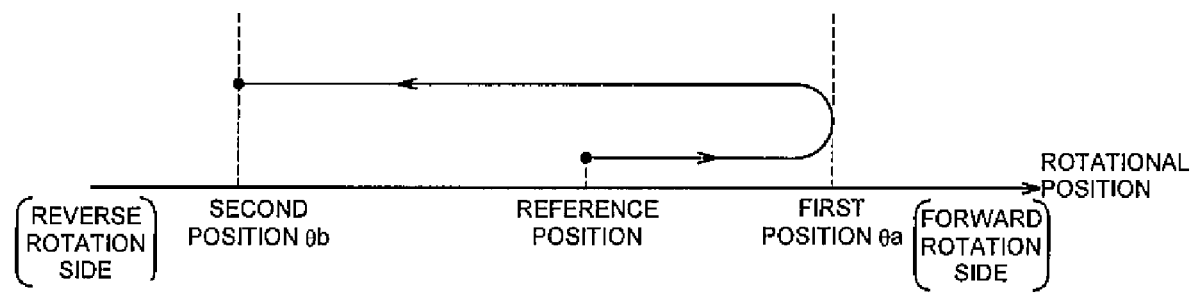
FIG. 14 is a diagram that illustrates the rotational operation of the shift shaft.

Then, the above-described low current is supplied to actuator 75, whereby shift shaft 70 is caused to rotate from the reference position in a determined direction (step S3). The low current is a current that is not sufficient to actuate torque converting mechanism 270. In the description that is given below, as shown in FIG. 14, shift shaft 70 is rotated in the normal direction. However, shift shaft 70 may be rotated in the backward direction.

Next, it is determined whether the rotational position of shift shaft 70 has passed beyond a determined range (step S4). In step S4, if the rotational position of shift shaft 70 has passed beyond the determined range, there is a possibility that an abnormality of torque converting mechanism 270 or the like has occurred. Thus, if the rotational position of shift shaft 70 has passed beyond the determined range, the measurement is cancelled (step S16). On the other hand, if the rotational position of shift shaft 70 is within the determined range in step S4, the routine proceeds to step S5.

In step S5, it is determined whether or not shift shaft 70 has stopped rotating. If shift shaft 70 has not stopped, the routine returns to step S4 again, where it is determined whether or not the rotational position of shift shaft 70 has passed beyond the determined range. On the other hand, in step S5, if it is determined that rotation of shift shaft 70 has stopped, the rotational position of shift shaft 70 at that time is obtained as a first position θa (step S6). Whether or not the rotation of shift shaft 70 has stopped can easily be determined based on, for example, detecting the position of shift shaft 70 using rotational position sensor 106 and then determining whether this position changes during elapse of a determined time, or the like.

Next, the low current is supplied to actuator 75 thereby causing shift shaft 70 to rotate in the opposite direction from the rotational direction in step S3 (step S7). Then, it is determined whether or not the rotational position of shift shaft 70 has passed beyond a determined range (step S8). If the rotational position of shift shaft 70 has passed beyond the determined range, there is a possibility that an abnormality of torque converting mechanism 270 or the like has occurred. Thus, if the rotational position of shift shaft 70 has passed beyond the determined range, the measurement is cancelled (step S16). On the other hand, if the rotational position of shift shaft 70 is within the determined range, the routine proceeds to step S9.

In step S9, it is determined whether or not shift shaft 70 has stopped rotating. If shift shaft 70 has not stopped, the routine returns to step S8, where it is determined whether or not the rotational position of shift shaft 70 has passed beyond the determined range. On the other hand, if rotation of shift shaft 70 has stopped, the rotational position of shift shaft 70 at that time is obtained as a second position θb (step S10).

Next, the area of play is calculated (step S11). More particularly, the absolute value of the difference of first position θa obtained in step S6 shown in FIG. 12 and second position θb obtained in step S10 is taken and calculated to be the area of play. The calculated area of play is then memorized in memory device 109 (step S12). The calculated area of play may be memorized in a ROM or the like that is provided separately from memory device 109.

Next, ECU 100 supplies a current to actuator 75, thereby returning shift shaft 70 to the reference position (0°) (step S13). Warning lamp 110 is then turned off (step S14), and the shift change disabling flag is set to OFF (step S15). With this processing, the area of play measurement process is ended.

—Control of the Shift Operation Based on the Initial Check—

In this embodiment, when engine 29 is being started, the shift change is controlled based on the area of play detected by the initial check performed as described above. More particularly, the shift operation is controlled such the partial clutch engagement control is definitely performed in the confirmed partial clutch engagement region. More specifically, the timing at which the rotational speed of shift shaft 70 becomes slower (t14, t24) and the timing at which the rotational speed of shift shaft 70 becomes faster again (t15, t25) are determined by the confirmed partial clutch engagement region (also refer to FIG. 9 and FIG. 10). In the following explanation, during the time when motorcycle 10 is being started, correction values of timings t14, t24, t15 and t25 are indicated by the general term "correction value $\Delta T$ (t=0)."

More concretely, the timing at which the rotational speed of shift shaft 70 becomes slower (t14, t24) and the timing at which the rotational speed of shift shaft 70 becomes faster again (t15, t25), namely, correction value $\Delta T$ (t=0), is determined in the following manner.

The correlation of the degree of play measured by the initial check and the correction value $\Delta T$ (t=0) (hereinafter referred to as the "correction value correlation") is stored in memory device 109 in advance. CPU 101 reads the correction value correlation, and the area of play obtained by the initial check from memory device 109. CPU 101 uses the read correction value correlation as a basis for determining from the area of play the correction value $\Delta T$ (t=0) at the time when motorcycle 10 is started. Then, a control signal that corresponds with the determined correction value $\Delta T$ (t=0) is output to drive circuit 107. As a result, the partial engagement clutch control is favorably performed in accordance with the area of play.

There may be a difference between a correction value $\Delta T14$ ($\Delta T24$) from a reference timing (t14, t24) at which the rotational speed of shift shaft 70 becomes slower and a correction value $\Delta T15$ ($\Delta T25$) from a reference timing (t15, t25) at which the rotational speed of shift shaft 70 becomes faster at the time when motorcycle 10 is being started. Alternatively, correction values $\Delta T14$ ($\Delta T24$) and $\Delta T15$ ($\Delta T25$) may be the same. In other words, the correction value $\Delta T$ (t=0) may be determined such that the period during which partial clutch engagement control is performed is varied, or such that the period during which partial clutch engagement control is performed is always constant. For example, a configuration could be adopted in which correction value $\Delta T14$ ($\Delta 24$) is set to a value other than 0, and $\Delta T15$ ($\Delta 25$) is set at a fixed value of 0.

—Control of the Shift Operation Based on Temperature of Gear Box 38—

In addition to controlling the shift operation based on the above-described initial check, the shift operation may also be controlled based on a temperature of gear box 38. More particularly, during running, at least one of the timing at which the rotational speed of shift shaft 70 becomes slower (t14, t24) and the timing at which the rotational speed of shift shaft 70 becomes faster again (t15, t25) may be corrected based on the temperature of gear box 38 such that, at the least, the rotational speed of shift shaft 70 while variable speed clutch 37 is in a partially engaged state becomes slower than the rotational speed of shift shaft 70 at other times.

In this embodiment, both the timing at which the rotational speed of shift shaft 70 becomes slower (t14, t24) and the timing at which the rotational speed of shift shaft 70 becomes faster again (t15, t25) are corrected based on the same correction coefficient $\Delta T(t)$. However, the embodiment is not limited to this configuration. The timing at which the rotational speed of shift shaft 70 becomes slower (t14, t24) and the timing at which the rotational speed of shift shaft 70 becomes faster again (t15, t25) may be corrected based on different correction coefficients $\Delta T(t)$. Alternatively, just the timing at which the rotational speed of shift shaft 70 becomes slower (t14, t24) may be corrected.

(More Specific Control Details)

In this embodiment, the temperature of gear box 38 is not measured using a temperature sensor or the like. The correction value $\Delta T$ is calculated based on the speed of engine 29 and a driven time of engine 29 because the speed of engine 29 and an elapsed time from when engine 29 was started (driven period) correlate with the temperature of gear box 38, and the temperature of gear box 38 correlates with the area of play. In other words, the correction value $\Delta T$ is calculated using a temperature of gear box 38 that is estimated based on the speed of engine 29 and the driven time of engine 29.

More particularly, in this embodiment, the range of the speeds that engine 29 can reach is divided into a plurality of regions, and a correction function $\Delta T(t)$ when the speed of engine 29 is in each speed region is memorized in advance in memory device 109 shown in FIG. 7. Then, CPU 101 reads the correction functions $\Delta T(t)$, and uses the read correction functions $\Delta T(t)$ to calculate the correction value $\Delta T$. However, the invention is not limited to this configuration, and, for example, a single correction function $\Delta T(t)$ that does not have any relationship to the speed of engine 29 may be used to calculate the correction value $\Delta T$.

Figure 15:
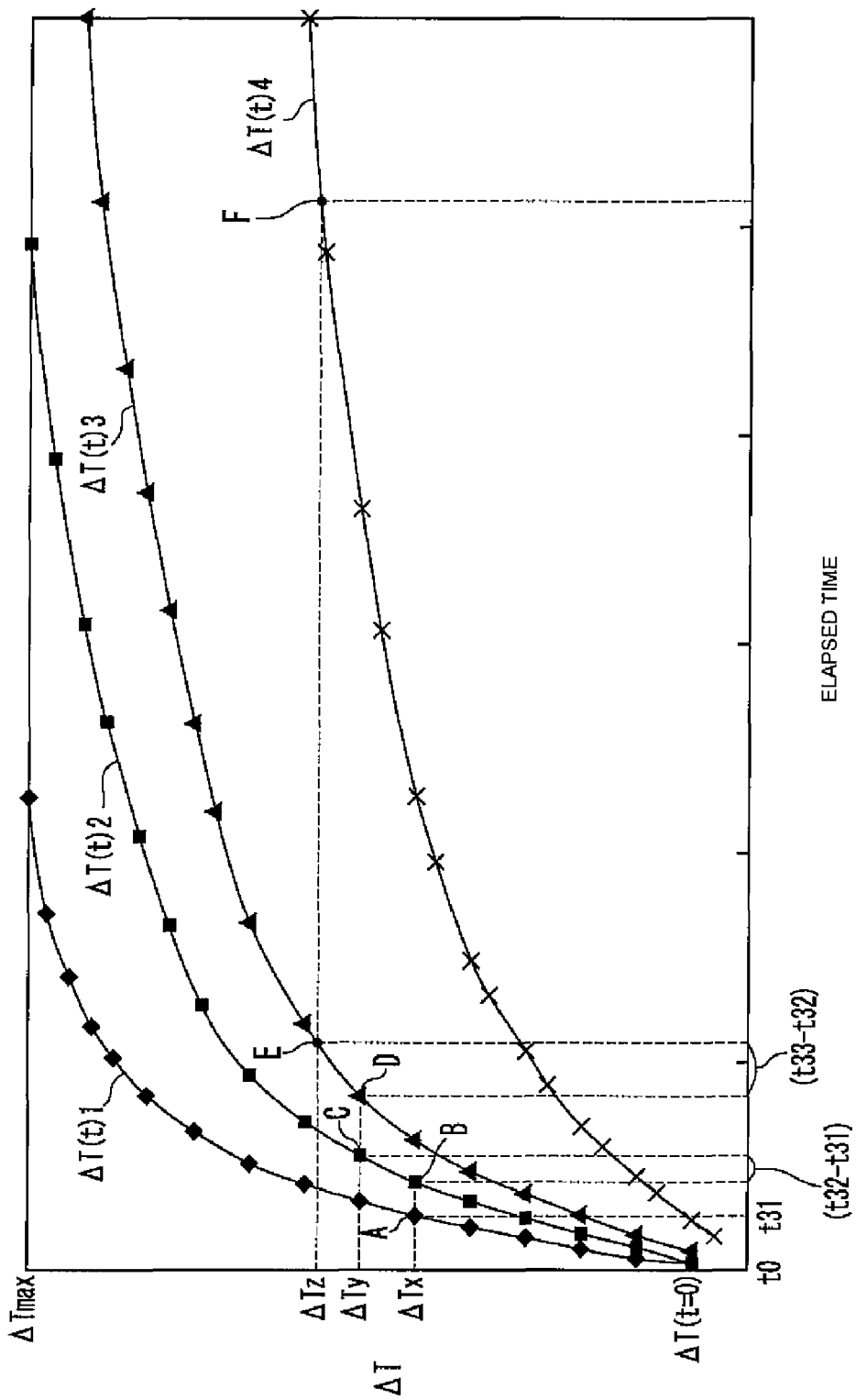
FIG. 15 is a graph of a correction function $\Delta T(t)$ according to the invention.

FIG. 15 is a graph of the correction function $\Delta T(t)$. As can be seen from FIG. 15, four correction functions, namely, $\Delta T(t)1$-$\Delta T(t)4$ are set. $\Delta T(t)1$ is the correction function when the speed of engine 29 is highest. $\Delta T(t)4$ is the correction function when the speed of engine 29 is lowest. Each correction function $\Delta T(t)1$-$\Delta T(t)4$ is a function starting from $\Delta T$ (t=0) that is computed by the initial check. The various respective correction functions $\Delta T(t)1$-$\Delta T(t)4$ with respect to $\Delta T$ (t=0) are all memorized in memory device 109, and the functions starting from $\Delta T$ (t=0) computed by the initial check are appropriately selected and read by CPU 101.

In the following explanation, when a speed r of engine 29 is equal to or less than R1, $\Delta T(t)1$ is applied, as shown in FIG. 17. When speed r is larger than R1 and equal to or less than R2, $\Delta T(t)2$ is applied. When speed r is larger than R2 and equal to or less than R3, $\Delta T(t)3$ is applied. And, when speed r is larger than R3, $\Delta T(t)4$ is applied. The correction functions $\Delta T(t)1$-$\Delta T(t)4$ may be measured experimentally.

As described above, CDI unit 105 detects the engine speed. CPU 101 uses the engine speed detected by CDI unit 105 to calculate an average value (average engine speed) of the engine speed for each of a determined period. In addition, in CPU 101, the correction function that accords with the speed region to which the calculated average engine speed belongs is used as a basis for calculating the correction value $\Delta T$ for the corresponding determined period.

For example, when the calculated average engine speed r is equal to or less than R1, in the period during which the average engine speed was calculated, the correction value $\Delta T$ is calculated based on correction function $\Delta T(t)1$. When the calculated average engine speed r is more than R2 and equal to or less than R3, in the period during which the average engine speed was calculated, the correction value $\Delta T$ is calculated based on correction function $\Delta T(t)3$. The frequency at which the average engine speed is calculated is not particularly limited. For example, the average engine speed may be calculated at periods of a few hundreds of a second.

Figure 16:
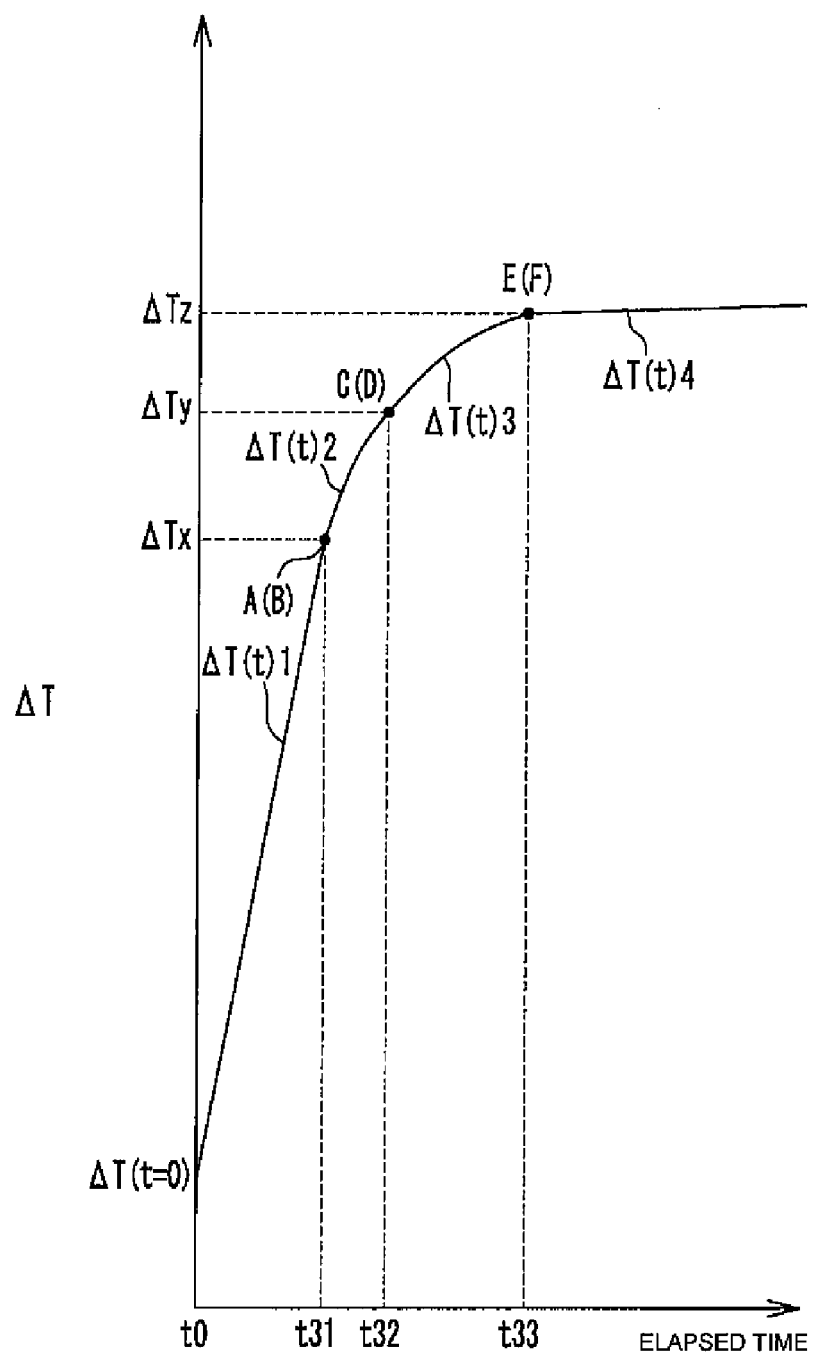
FIG. 16 is a graph that shows change in the correction value $\Delta T$.

A concrete example is now explained with reference to FIGS. 15 and 16. When the average engine speed detected by CDI unit 105 is determined by CPU 101 to belong to R1 during the period from t0 when motorcycle 10 is started to t31, the correction value ΔT is calculated based on correction function ΔT(t)1 in the period from t0 to t31. More specifically, the section from point t0 of ΔT(t)1 to point A is applied. As a result, the correction value at t31 is calculated to be ΔTx as shown in FIG. 16.

When the average engine speed detected by CDI unit 105 is determined by CPU 101 to belong to R2 during the time from t31 to t32, the correction value ΔT is calculated based on correction function ΔT(t)2 in the period from t31 to t32. More particularly, the correction value ΔT is calculated based on the section of correction function ΔT(t)2 from point B that has correction value ΔTx that is the same as that of point A shown in FIG. 15 as far as point C after elapse of the period (t32-t31) from point B. As a result, as shown in FIG. 16, the correction value at t31 is set to ΔTy.

When the average engine speed detected by CDI unit 105 is determined by CPU 101 to belong to R3 during the time from t32 to t33, correction value ΔT is calculated based on correction function ΔT(t)3 in the period from t32 to t33. More particularly, the correction value ΔT is calculated based on the section of correction function ΔT(t)2 from point D that has correction value ΔTy that is the same as that of point C shown in FIG. 15 as far as point E after elapse of the period (t33-t32) from point D. As a result, as shown in FIG. 16, the correction value at t32 is set to ΔTz.

After t33, in the case that the average engine speed detected by CDI unit 105 is determined by CPU 101 to belong to R4, after t33 the correction value ΔT is calculated based on correction function ΔT(t)4. More particularly, the correction value ΔT is calculated based on the section of correction function ΔT(t)2 from point F that has correction value ΔTz that is the same as that of point E shown in FIG. 15. As described above, in CPU 101 the correction value ΔT is regularly calculated. In addition, CPU 101 performs partial clutch engagement control in accordance with the calculated correction value ΔT, namely, the degree of play.

However, after the temperature of gear box 38 has increased to a constant temperature (maximum temperature), the temperature becomes roughly stable. As a result, the area of play of shift shaft 70 does not change after variable speed clutch 37 reaches the maximum temperature. Accordingly, it is sufficient if the above-described calculation of the average engine speed and the calculation of the correction value ΔT are performed until variable speed clutch 37 reaches the maximum temperature. More particularly, until the calculated correction value ΔT reaches correction value ΔTmax when variable speed clutch 37 reaches the maximum temperature, the above-described calculation of the average engine speed and the calculation of the correction value ΔT are performed. After this, the finally calculated correction value ΔT may be continually applied until engine 29 is stopped. Furthermore, even if the correction value ΔTmax is not reached, the calculation of the average engine speed and the calculation of the correction value ΔT may be cancelled after a determined time has elapsed (for example, 2 hours) from when engine 29 was started. For example, even if the correction value ΔTmax is not reached, when 2 hours have elapsed from when engine 29 was started, the calculation of the average engine speed and the calculation of the correction value ΔT may be cancelled.

—Operation and Effects—

As described above, actuator 75 is controlled based on the temperature of gear box 38. Accordingly, if the area of play of shift shaft 70 changes due to temperature change of gear box 38 during continuous running, thereby causing the timing at which variable speed clutch 37 enters the partially engaged state to change or the period during which variable speed clutch 37 is in the partially engaged state to change, control is constantly performed such that the rotational speed of shift shaft 70 becomes slower when variable speed clutch 37 is in the partially engaged state. Accordingly, shift shock during continuous running is effectively reduced.

With a manual transmission in which shift change is performed by a rider operating the shift pedal, because the rider adjusts operation of the shift pedal, there are times when adjustment of the operation of the shift pedal is not performed appropriately depending on the degree of proficiency of the rider. However, according to the present invention, control of actuator 75 is automatically performed based on the temperature of gear box 38. Thus, regardless of the degree of experience of the rider, control of the shift operation is performed appropriately.

Because this method of reducing shift shock by controlling actuator 75 based on the temperature of gear box 38 is used, there is no need for a plurality of sensors and the structure of transmission 1 is not complicated. In addition, the cost of transmission 1 is not increased substantially. More particularly, because shift shock is reduced by controlling actuator 75 based on the temperature of gear box 38, shift shock during continuous running is effectively reduced without substantially increasing the cost of transmission 1.

For example, if the temperature of gear box 38 were actually measured to control actuator 75, it would be necessary to provide a temperature sensor. As a result, the cost of transmission 1 would be increased. In the present invention, by contrast, control of actuator 75 is based on engine speed and the driven period of engine 29 that have a correlation with the temperature of gear box 38, and correction functions that are memorized in advance in memory device 109. As a result, a separate temperature sensor or the like for measuring the temperature of gear box 38 is not necessary. Accordingly, the number of components is comparatively fewer, and transmission 1 can be made at a reasonable price, thereby allowing motorcycle 10 to be provided at a reasonable price.

For example, in the case that, after engine 29 has been stopped, engine 29 is started again while the remaining heat of gear box 38 has not yet been fully dissipated, the area of play of shift shaft 70 when engine 29 is started again is different from the area of play of shift shaft 70 when gear box 38 is at a normal temperature. Thus, the temperature of gear box 38 is not necessarily constant when engine 29 is started. Therefore, the area of play of shift shaft 70 is not necessarily constant when engine 29 is started. Accordingly, if actuator 75 is controlled based on the engine speed and the driven period of engine 29 and the correction functions, there is a possibility that shift shock immediately after engine 29 is started again will become larger.

In order to address this difficulty, in addition to the above-described control of actuator 75 based on the temperature of gear box 38, the shift operation is also controlled based on the initial check. As a result, the area of play of shift shaft 70 when engine 29 is started is accurately detected. In addition, the detection area of play of shift shaft 70 is used as a basis for performing control of the shift operation based on the temperature of gear box 38 thereafter. Accordingly, more accurate partial clutch engagement control is performed. and shift shock during continuous running is effectively reduced.

The area of play of shift shaft 70 will change with the passing of time due to deterioration of variable speed clutch 37. Thus, as the use period of the vehicle becomes comparatively longer, the engagement state of variable speed clutch 37 changes. Further, as the use period of the vehicle becomes comparatively longer, the shift shock becomes larger. However, it is not possible to deal with this age-related change in the engagement state of variable speed clutch 37 by just using the above-described control of actuator 75 based on the temperature of gear box 38.

In this embodiment, the control of the shift operation based on the initial check is performed in combination. As a result, changes in the area of play of shift shaft 70 caused by deterioration of variable speed clutch 37 can also be dealt with. For example, if there is wear of friction plates 39a and clutch plates 39b due to long term use, friction between friction plates 39a and clutch plates 39b reduces, thereby changing the area of play of shift shaft 70 as compared to before. Typically, the area of play of shift shaft 70 increases with age. Thus, if the initial check is not performed, it is not possible to accurately detect the area of play of shift shaft 70 during running. As a result, there is a possibility that the shift shock during running will increase. However, in contrast to this, in this embodiment, because the initial check is performed when engine 29 is started, changes in the area of play of shift shaft 70 caused by deterioration of variable speed clutch 37 are accurately detected. Therefore, even if variable speed clutch 37 has deteriorated, shift shock during running is effectively reduced.

In this embodiment, the initial check is performed only when engine 29 is started. However, the initial check may be performed on a regular basis after engine 29 has been started. In addition, the rider may choose to perform the initial check on a discretionary basis. For example, if the rider senses during running that shift shock has increased, the initial check may be performed. Moreover, the area of play of shift shaft 70 obtained as a result of the initial check may be used for various uses other than the above-described control of the shift operation, such as for checking for abnormalities of motorcycle 10 or the like.

In this embodiment, an example has been given in which both control of the shift operation based on the initial check and control of the shift operation based on the temperature of gear box 38 are performed. However, a configuration may be adopted in which control of the shift operation based on the temperature of gear box 38 is independently performed to reduce shift shock during continuous running. However, as described above, taking into consideration the temperature of gear box 38 when engine 29 is started and deterioration of variable speed clutch 37, control of the shift operation based on the initial check is preferably used in combination.

In addition, partial clutch engagement control may be performed throughout all shift changes, or just for shift changes from one specific gear to another gear. Furthermore, a configuration may be adopted in which, when the partial clutch engagement control is not performed, the above-described control of actuator 75 based on the temperature of gear box 38 is not performed when a shift change is performed. Further, even when partial clutch engagement control is performed, depending on the content of the partial clutch engagement control, control of actuator 75 based on temperature of gear box 38 need not be performed. For example, when shifting up from first speed to second speed or from second speed to third speed when the gear ratio is comparatively high, and when shifting down from each gear ratio, the partial clutch engagement control may be performed along with the control of actuator 75 based on the temperature of gear box 38.

In addition, the rotational speed of shift shaft 70 during the partial clutch engagement control can be set appropriately. For example, the rotational speed of shift shaft 70 during the partial clutch engagement control may be set to differ in accordance with the temperature of gear box 38. For example, the rotational speed of shift shaft 70 during the partial clutch engagement control when the temperature of gear box 38 is high may be set to be faster than that when the temperature of gear box 38 is low. On the other hand, the rotational speed of shift shaft 70 during the partial clutch engagement control when the temperature of gear box 38 is high may be set to be slower than that when the temperature of gear box 38 is low.

Moreover, the rotational speed of shift shaft 70 during the partial clutch engagement control may be changed appropriately in accordance with the gear ratio before and after the shift change. For example, the rotational speed of shift shaft 70 during the partial clutch engagement control when shifting up from first speed to second speed where the gear ratio is comparatively high may be set to be slower than that when shifting up from second speed to third speed when the gear ratio is comparatively low.

Modified Examples

In the above-described embodiment, an example is given in which a temperature sensor is not provided, and the temperature of gear box 38 is estimated based on the rotational speed and the driven time of engine 29. However, the invention is not limited to this configuration, and a temperature sensor or the like may be provided to measure the temperature of gear box 38. For example, a temperature sensor may be disposed on any one of the structural members of gear box 38, and the temperature measured by the temperature sensor may be used in control of actuator 75. Alternatively, the temperature measured by the temperature sensor may be used as a basis for estimating the temperature of gear box 38. The temperature sensor may be disposed on, for example, crank case 35, main shaft 44 or clutch mechanism 2. Alternatively, since the temperatures of engine 29 and gear box 38 are correlated, the temperature sensor may be disposed on engine 29, and the temperature obtained used as a basis for estimating the temperature of gear box 38.

The temperature of gear box 38 may also be estimated from the temperature of the lubricating oil. For example, an oil temperature sensor may measures the temperature of the lubricating oil that lubricates gear box 38, and the temperature measured thereby used as the temperature of gear box 38. Or, an oil temperature sensor that measures the temperature of the lubricating oil for engine 29 may be provided, and the temperature measured thereby used to estimate the temperature of gear box 38. Note that, the lubricating oil for engine 29 and the lubricating oil for gear box 38 may be commonly used.

In this manner, if a temperature sensor is provided to estimate the temperature of gear box 38 by measuring the temperature of a structural member of gear box 38 or the temperature of the lubricating oil, regardless of the speed of engine 29, the temperature of gear box 38 can be more accurately estimated in real time. Accordingly, shift shock during continuous running is reduced more favorably. However, the cost of transmission 1 is increased by provision of a temperature sensor. Thus, the number of temperature sensors is preferably kept as low as possible, and most preferably to just one temperature sensor.

For example, if the temperature of gear box 38 is estimated from the speed and the driven time of engine 29, the temperature of gear box 38 when engine 29 is started cannot be calculated. Thus, there is a possibility that shift shock will not be adequately reduced immediately after engine 29 is started again. Further, if the timing of the partial clutch engagement control when engine 29 is started is not appropriate, while engine 29 is being driven, it is not possible to perform the partial clutch engagement control in a better manner as compared to when engine 29 is started. Accordingly, the above-described initial check is preferably performed in combination.

On the other hand, if a temperature sensor is used to measure the temperature of the structural member of gear box 38, because the temperature of gear box 38 when engine 29 is started is estimated, even immediately after a time when engine 29 has been run continuously once, then stopped, and then started again, it is possible to more accurately control actuator 75. Accordingly, even if the initial check is not performed, shift shock immediately after engine 29 has been started again can be reduced.

However, even when a temperature sensor is used to measure the temperature of the structural member of gear box 38, it is not possible to handle age deterioration of variable speed clutch 37. Thus, even when the temperature of the structural member of gear box 38 is measured using a temperature sensor, the initial check is preferably used in combination.

The particular embodiments of the invention described in this document should be considered illustrative, rather than restrictive. Modification to the described embodiments may be made without departing from the spirit of the invention as defined by the following claims.

The invention claimed is:

1. A transmission that transmits power of an engine, comprising:
   a shift shaft;
   an actuator that causes the shift shaft to rotate;
   a gear box including a gear shift mechanism that is actuated in response to rotation of the shift shaft, a clutch mechanism that connects and disconnects transmission of power from the engine to the gear shift mechanism in response to rotation of the shift shaft, and a case that houses the gear shift mechanism and the clutch mechanism; and
   a control portion that controls the actuator based on a temperature of the gear box; wherein
   the clutch mechanism includes a clutch that connects and disconnects transmission of power from the engine to the gear shift mechanism, and a clutch transmission mechanism that actuates the clutch in response to rotation of the shift shaft by the actuator.

2. The transmission according to claim 1, wherein
   the clutch is lubricated by lubricating oil, and
   the control portion estimates the temperature of the gear box from a temperature of the lubricating oil.

3. The transmission according to claim 2, further comprising:
   an oil temperature sensor that measures the temperature of the lubricating oil.

4. The transmission according to claim 1, wherein the control portion estimates the temperature of the gear box based on a number of revolutions per unit time of the engine and a driven time of the engine.

5. The transmission according to claim 1, wherein the control portion measures an area of play of the shift shaft that is a rotational position range in which the clutch transmission mechanism is not driven even when the shift shaft rotates, and uses the measured area of play as a basis for controlling the actuator.

6. The transmission according to claim 5, wherein the control portion measures the area of play of the shift shaft when the engine is being started.

7. The transmission according to claim 1, wherein the control portion calculates a rotational position range of the shift shaft when the clutch mechanism is in a partially engaged state based on the temperature of the gear box, and controls the actuator such that, at the least, a rotational speed of the shift shaft in the calculated rotational position range is slower than a rotational speed of the shift shaft in other rotational position ranges.

8. A straddle type vehicle comprising the transmission according to claim 1.

9. A control method for a transmission comprising a shift shaft; an actuator that causes the shift shaft to rotate; and a gear box including a gear shift mechanism that is actuated in association with rotation of the shift shaft, a clutch mechanism that connects and disconnects transmission of power from the engine to the gear shift mechanism in association with rotation of the shift shaft, and a case that houses the gear shift mechanism and the clutch mechanism; the clutch mechanism including a clutch that connects and disconnects transmission of power from the engine to the gear shift mechanism, and a clutch transmission mechanism that actuates the clutch in response to rotation of the shift shaft by the actuator, the control method comprising:
   controlling the actuator based on a temperature of the gear box.

10. The control method for a transmission according to claim 9, further comprising:
    calculating a rotational position range of the shift shaft when the clutch mechanism is in a partially engaged state based on the temperature of the gear box, and
    controlling the actuator such that, at the least, a rotational speed of the shift shaft in the calculated rotational position range is slower than a rotational speed of the shift shaft in other rotational position ranges.

* * * * *